(12) United States Patent
Liao et al.

(10) Patent No.: US 8,908,290 B1
(45) Date of Patent: Dec. 9, 2014

(54) OPTICAL IMAGING LENS SYSTEM, IMAGE CAPTURING DEVICE AND MOBILE TERMINAL

(71) Applicant: Largan Precision Co., Ltd., Taichung (TW)

(72) Inventors: Lin-Yao Liao, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/049,234

(22) Filed: Oct. 9, 2013

(30) Foreign Application Priority Data

Sep. 30, 2013 (TW) .............................. 102135360 A

(51) Int. Cl.
*G02B 3/02* (2006.01)
*G02B 13/00* (2006.01)

(52) U.S. Cl.
CPC .................................. *G02B 13/0045* (2013.01)
USPC ........................................................ 359/715

(58) Field of Classification Search
CPC .................................................. G02B 13/0045
USPC .......................................................... 359/715
See application file for complete search history.

(56) References Cited

U.S. PATENT DOCUMENTS

2014/0240852 A1* 8/2014 Hsu et al. ...................... 359/713

* cited by examiner

*Primary Examiner* — James Jones
(74) *Attorney, Agent, or Firm* — CKC & Partners Co., Ltd.

(57) ABSTRACT

An optical imaging lens system includes, in order from an object side to an image side, a first lens element, a second lens element, a third lens element, a fourth lens element, a fifth lens element, and a sixth lens element. The first lens element has refractive power. The second lens element has positive refractive power. The third lens element has positive refractive power. The fourth lens element has refractive power. The fifth lens element with positive refractive power has a convex object-side surface and a convex image-side surface, wherein both of the surfaces thereof are aspheric. The sixth lens element with refractive power has a concave image-side surface, wherein both of the surfaces thereof are aspheric, and at least one of the surfaces thereof has at least one inflection point. The optical imaging lens system has a total of six lens elements with refractive power.

26 Claims, 17 Drawing Sheets

OPTICAL IMAGING LENS SYSTEM, IMAGE CAPTURING DEVICE AND MOBILE TERMINAL

RELATED APPLICATIONS

This application claims priority to Taiwan Application Serial Number 102135360, filed Sep. 30, 2013, which is incorporated by reference herein in its entirety.

BACKGROUND

1. Technical Field

The present disclosure relates to an optical imaging lens system. More particularly, the present disclosure relates to a compact optical imaging lens system applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the surface shape and refractive power of the fifth lens element is not favorable for enlarging the field of view. Moreover, the refractive power of the second lens element and the third lens element cannot avoid the astigmatism and distortion from being excessively increased in a peripheral region of an image. Accordingly, it is not applicable to the mobile terminals with high image quality.

SUMMARY

According to one aspect of the present disclosure, an optical imaging lens system includes, in order from an object side to an image side, a first lens element, a second lens element, a third lens element, a fourth lens element, a fifth lens element, and a sixth lens element. The first lens element has refractive power. The second lens element has positive refractive power. The third lens element has positive refractive power. The fourth lens element has refractive power. The fifth lens element with positive refractive power has a convex object-side surface and a convex image-side surface, wherein both of the object-side surface and the image-side surface of the fifth lens element are aspheric. The sixth lens element with refractive power has a concave image-side surface, wherein an object-side surface and the image-side surface of the sixth lens element are aspheric, and at least one of the object-side surface and the image-side surface of the sixth lens element has at least one inflection point. The optical imaging lens system has a total of six lens elements with refractive power. When a curvature radius of the object-side surface of the fifth lens element is R9, a curvature radius of the image-side surface of the fifth lens element is R10, a focal length of the optical imaging lens system is f, a focal length of the fourth lens element is f4, and a focal length of the fifth lens element is f5, the following conditions are satisfied:

$$-1.0 < R9/R10 < 0; \text{ and}$$

$$2.25 < |f/f4| + f/f5 < 5.0.$$

According to another aspect of the present disclosure, an image capturing device includes the optical imaging lens system according to the aforementioned aspect and an image sensor, wherein the image sensor is located on an image plane of the optical imaging lens system.

According to still another aspect of the present disclosure, a mobile terminal includes the image capturing device according to the another aspect.

According to yet another aspect of the present disclosure, an optical imaging lens system includes, in order from an object side to an image side, a first lens element, a second lens element, a third lens element, a fourth lens element, a fifth lens element, and a sixth lens element. The first lens element has refractive power. The second lens element has positive refractive power. The third lens element has positive refractive power. The fourth lens element has refractive power. The fifth lens element with positive refractive power has a convex object-side surface and a convex image-side surface, wherein both of the object-side surface and the image-side surface of the fifth lens element are aspheric. The sixth lens element with refractive power has a concave image-side surface, wherein an object-side surface and the image-side surface of the sixth lens element are aspheric, and at least one of the object-side surface and the image-side surface of the sixth lens element has at least one inflection point. The optical imaging lens system has a total of six lens elements with refractive power. When a curvature radius of the object-side surface of the fifth lens element is R9, a curvature radius of the image-side surface of the fifth lens element is R10, a focal length of the optical imaging lens system is f, and a focal length of the second lens element is f2, the following conditions are satisfied:

$$-1.0 < R9/R10 < 0; \text{ and}$$

$$0.05 < f/f2 < 0.70.$$

According to still yet another aspect of the present disclosure, an optical imaging lens system includes, in order from an object side to an image side, a first lens element, a second lens element, a third lens element, a fourth lens element, a fifth lens element, and a sixth lens element. The first lens element has refractive power. The second lens element has positive refractive power. The third lens element has positive refractive power. The fourth lens element has negative refractive power. The fifth lens element with positive refractive power has a convex object-side surface and a convex image-side surface, wherein both of the object-side surface and the image-side surface of the fifth lens element are aspheric. The sixth lens element with refractive power has a concave image-side surface, wherein an object-side surface and the image-side surface of the sixth lens element are aspheric, and at least one of the object-side surface and the image-side surface of the sixth lens element has at least one inflection point. The optical imaging lens system has a total of six lens elements with refractive power. When a curvature radius of an object-side surface of the third lens element is R5, a curvature radius of an image-side surface of the third lens element is R6, a curvature radius of the object-side surface of the fifth lens element is R9, a curvature radius of the image-side surface of the fifth lens element is R10, a focal length of the optical imaging lens system is f, and a focal length of the second lens element is f2, the following conditions are satisfied:

$-1.0 < R9/R10 < 0;$ $0 < f/f2 < 0.70;$ and $-4 < R5/R6 < 20.$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
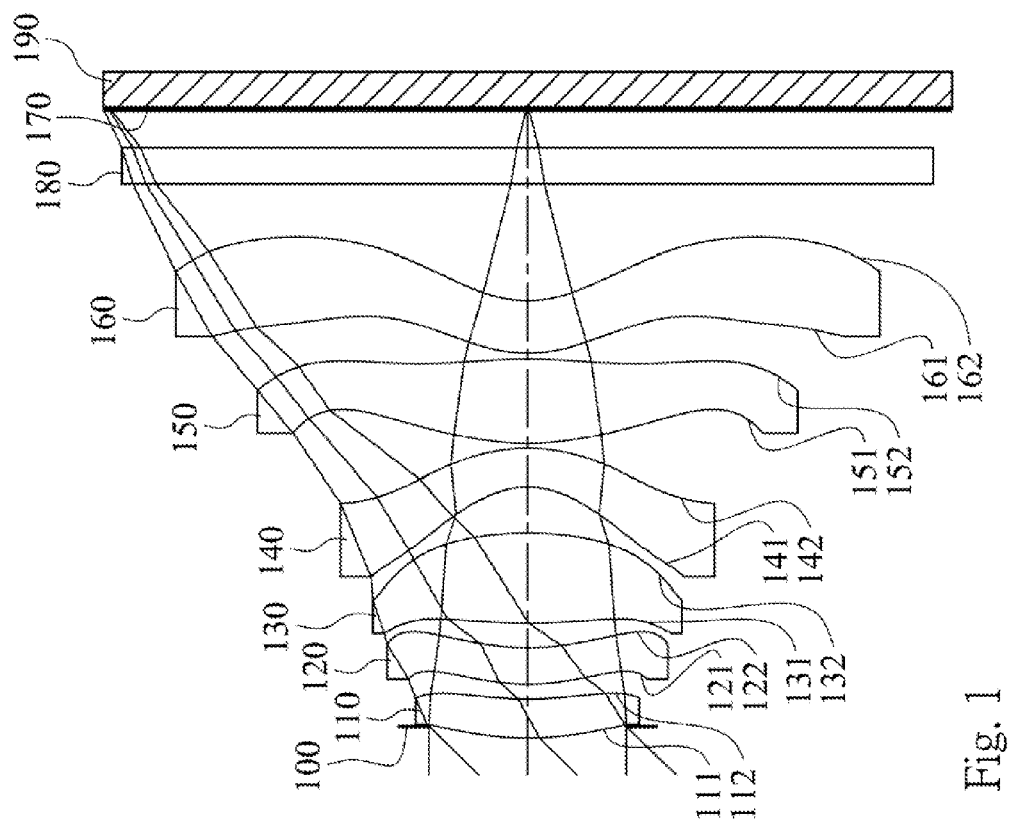
FIG. 1 is a schematic view of an image capturing device according to the 1st embodiment of the present disclosure.

An optical imaging lens system includes, in order from an object side to an image side, a first lens element, a second lens element, a third lens element, a fourth lens element, a fifth lens element, and a sixth lens element. The optical imaging lens system has a total of six lens elements with refractive power.

The first lens element with refractive power has a convex object-side surface, so that it is favorable for properly adjusting the positive refractive power of the first lens element.

The second lens element with positive refractive power can have a convex object-side surface and a concave image-side surface. Therefore, it provides the optical imaging lens system with the positive refractive power as it needs to be. It is thereby favorable for reducing the total track length of the optical imaging lens system. Furthermore, the second lens element can have the object-side surface being convex in a paraxial region thereof, wherein the object-side surface of the second lens element can have at least one concave shape in an off-axis region thereof. The second lens element can have the image-side surface being concave in a paraxial region thereof, wherein the image-side surface of the second lens element can have at least one convex shape in an off-axis region thereof. Accordingly, it is favorable for correcting the aberration of the off-axis.

The third lens element with positive refractive power can have a convex image-side surface, so that it is favorable for reducing the sensitivity of the optical imaging lens system and balancing the refractive powers of the lens elements in the optical imaging lens system. It is thereby favorable for avoiding the astigmatism and distortion from being excessively increased in a peripheral region of an image so as to further improve the image quality of the optical imaging lens system.

The fourth lens element can have negative refractive power, a concave object-side surface and a convex image-side surface. Therefore, it is favorable for correcting aberration and astigmatism.

The fifth lens element with positive refractive power has a convex object-side surface and a convex image-side surface. Therefore, it is favorable for the light gathering towards the image side of the optical imaging lens system so as to enlarge the field of view.

The sixth lens element with refractive power has a convex object-side surface and a concave image-side surface, so that it is favorable for further correcting the astigmatism. At least one of the object-side surface and the image-side surface of the sixth lens element has at least one inflection point, so that it is favorable for effectively reducing the incident angle of the light projecting onto to an image sensor so as to increase the responding efficiency of the image sensor. Furthermore, the sixth lens element can have the object-side surface being convex in a paraxial region thereof, wherein the object-side surface of the sixth lens element can have at least one concave shape in an off-axis region thereof. The sixth lens element can have the image-side surface being concave in a paraxial region thereof, wherein the image-side surface of the sixth lens element can have at least one convex shape in an off-axis region thereof. Accordingly, it is favorable for correcting the aberration of the off-axis.

When a curvature radius of the object-side surface of the fifth lens element is R9, and a curvature radius of the image-side surface of the fifth lens element is R10, the following condition is satisfied: $-1.0 < R9/R10 < 0$. Therefore, it is favorable for the light gathering towards the image side of the optical imaging lens system so as to enlarge the field of view.

When a focal length of the optical imaging lens system is f, a focal length of the fourth lens element is f4, and a focal length of the fifth lens element is f5, the following condition is satisfied: $2.25 < |f/f4| + f/f5 < 5.0$. Therefore, it is favorable for effectively reducing the astigmatism and spherical aberration.

When the focal length of the optical imaging lens system is f, and a focal length of the second lens element is f2, the following condition is satisfied: $0 < f/f2 < 0.70$. Therefore, it is favorable for balancing the refractive powers of the lens elements in the optical imaging lens system so as to avoid the astigmatism and distortion from being excessively increased in a peripheral region of an image and to further improve the image quality of the optical imaging lens system. Preferably, the following condition is satisfied: $0.05<f/f2<0.70$.

When a curvature radius of an object-side surface of the third lens element is R5, and a curvature radius of the image-side surface of the third lens element is R6, the following condition is satisfied: $-4<R5/R6<20$. Therefore, it is favorable for reducing the sensitivity of the optical imaging lens system. Preferably, the following condition is satisfied: $-4<R5/R6<0$.

When an axial distance between the third lens element and the fourth lens element is T34, an axial distance between the fourth lens element and the fifth lens element is T45, and an axial distance between the fifth lens element and the sixth lens element is T56, the following condition is satisfied: $0<(T45+T56)/T34<0.6$. Therefore, it is favorable for assembling the lens elements by properly adjusting the axial distances between the lens elements so as to keep the optical imaging lens system compact.

When the focal length of the second lens element is f2, and the focal length of the fifth lens element is f5, the following condition is satisfied: $0<f5/f2<0.8$. Therefore, it is favorable for effectively balancing the arrangement of the refractive powers of the optical imaging lens system.

When an Abbe number of the third lens element is V3, and an Abbe number of the fourth lens element is V4, the following condition is satisfied: $20<V3-V4<50$. Therefore, it is favorable for correcting the chromatic aberration of the optical imaging lens system.

When the focal length of the optical imaging lens system is f, and a focal length of the first lens element is f1, the following condition is satisfied: $-0.60<f/f1<0.40$. Therefore, it is favorable for adjusting the total track length of the optical imaging lens system. Preferably, the following condition is satisfied: $-0.50<f/f1<0.25$.

When an axial distance between the object-side surface of the first lens element and an image plane is TTL, and a maximum image height of the optical imaging lens system (half of a diagonal length of an effective photosensitive area of an image sensor) is ImgH, the following condition is satisfied: $TTL/ImgH<1.8$. Therefore, it is favorable for keeping the optical imaging lens system compact so as to be applied to compact mobile terminals.

When a maximal field of view of the optical imaging lens system is FOV, the following condition is satisfied: 70 degrees$<FOV<$120 degrees. Therefore, it is favorable for enlarging the field of view so as to obtain a larger image scene.

When an Abbe number of the second lens element is V2, the following condition is satisfied: $30<V2$. Therefore, it is favorable for correcting the chromatic aberration of the optical imaging lens system.

When the focal length of the second lens element is f2, a focal length of the third lens element is f3, and the focal length of the fourth lens element is f4, the following condition is satisfied: $|f4|<f3<f2$. Therefore, it is favorable for balancing the refractive powers of the lens elements in the optical imaging lens system so as to avoid the astigmatism and distortion from being excessively increased in a peripheral region of an image and to further improve the image quality of the optical imaging lens system.

The aforementioned optical imaging lens system can further include a stop, such as an aperture stop, wherein an axial distance between the stop and the image plane is SL, and the axial distance between the object-side surface of the first lens element and the image plane is TTL, the following condition is satisfied: $0.88<SL/TTL<1.2$. Therefore, it is favorable for making a good balance between the telecentricity and wide-angle feature.

When an f-number of the optical imaging lens system is Fno, and the following condition is satisfied: $1.5<Fno<2.3$. Therefore, the optical imaging lens system can obtain a large aperture.

According to the optical imaging lens system of the present disclosure, the lens elements thereof can be made of glass or plastic material. When the lens elements are made of glass material, the distribution of the refractive power of the optical imaging lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens system can also be reduced.

According to the optical imaging lens system of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the optical imaging lens system of the present disclosure, the optical imaging lens system can include at least one stop, such as an aperture stop, a glare stop or a field stop. Said glare stop or said field stop is for eliminating the stray light and thereby improving the image resolution thereof.

According to the optical imaging lens system of the present disclosure, an aperture stop can be configured as a front stop or a middle stop. A front stop disposed between an imaged object and the first lens element can provide a longer distance between an exit pupil of the optical imaging lens system and the image plane and thereby improves the image-sensing efficiency of an image sensor. A middle stop disposed between the first lens element and the image plane is favorable for enlarging the field of view of the optical imaging lens system and thereby provides a wider field of view for the same.

The present optical imaging lens system can be optionally applied to moving focus optical systems. According to the optical imaging lens system of the present disclosure, the optical imaging lens system is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the optical imaging lens system according to the aforementioned optical imaging lens system of the present disclosure, and an image sensor, wherein the image sensor is disposed on an image plane of the aforementioned optical imaging lens system. In the image capturing device, the fifth lens element of the optical imaging lens system has positive refractive power, the convex object-side surface and the convex image-side surface; therefore, it is favorable for the light gathering towards the image side of the optical imaging lens system so as to enlarge the field of view. Furthermore, both of the second and the third lens elements have positive refractive power, thus, it is favorable for distributing the refractive powers of the optical imaging lens system so as to avoid the astigmatism and distortion from being excessively increased in a peripheral region of an image and to further improve the image quality of the image capturing device. Preferably, the image capturing device can further include a barrel member, a holding member or a combination thereof.

According to the present disclosure, a mobile terminal is provided, wherein the mobile terminal includes the aforementioned image capturing device. The image capturing device includes the optical imaging lens system according to the aforementioned optical imaging lens system of the present disclosure, and the image sensor, wherein the image sensor is disposed on an image plane of the aforementioned optical imaging lens system. In the image capturing device, the fifth lens element of the optical imaging lens system has positive refractive power, the convex object-side surface and the convex image-side surface; therefore, it is favorable for the light gathering towards the image side of the optical imaging lens system so as to enlarge the field of view. Furthermore, both of the second and the third lens elements have positive refractive power, thus, it is favorable for distributing the refractive powers of the optical imaging lens system so as to avoid the astigmatism and distortion from being excessively increased in a peripheral region of an image and to further improve the image quality of the image capturing device. Preferably, the mobile terminal can further include but not limited to display, control unit, random access memory unit (RAM) a read only memory unit (ROM) or a combination thereof.

According to the above description of the present disclosure, the following 1st-10th specific embodiments are provided for further explanation.

1st Embodiment

Figure 2:
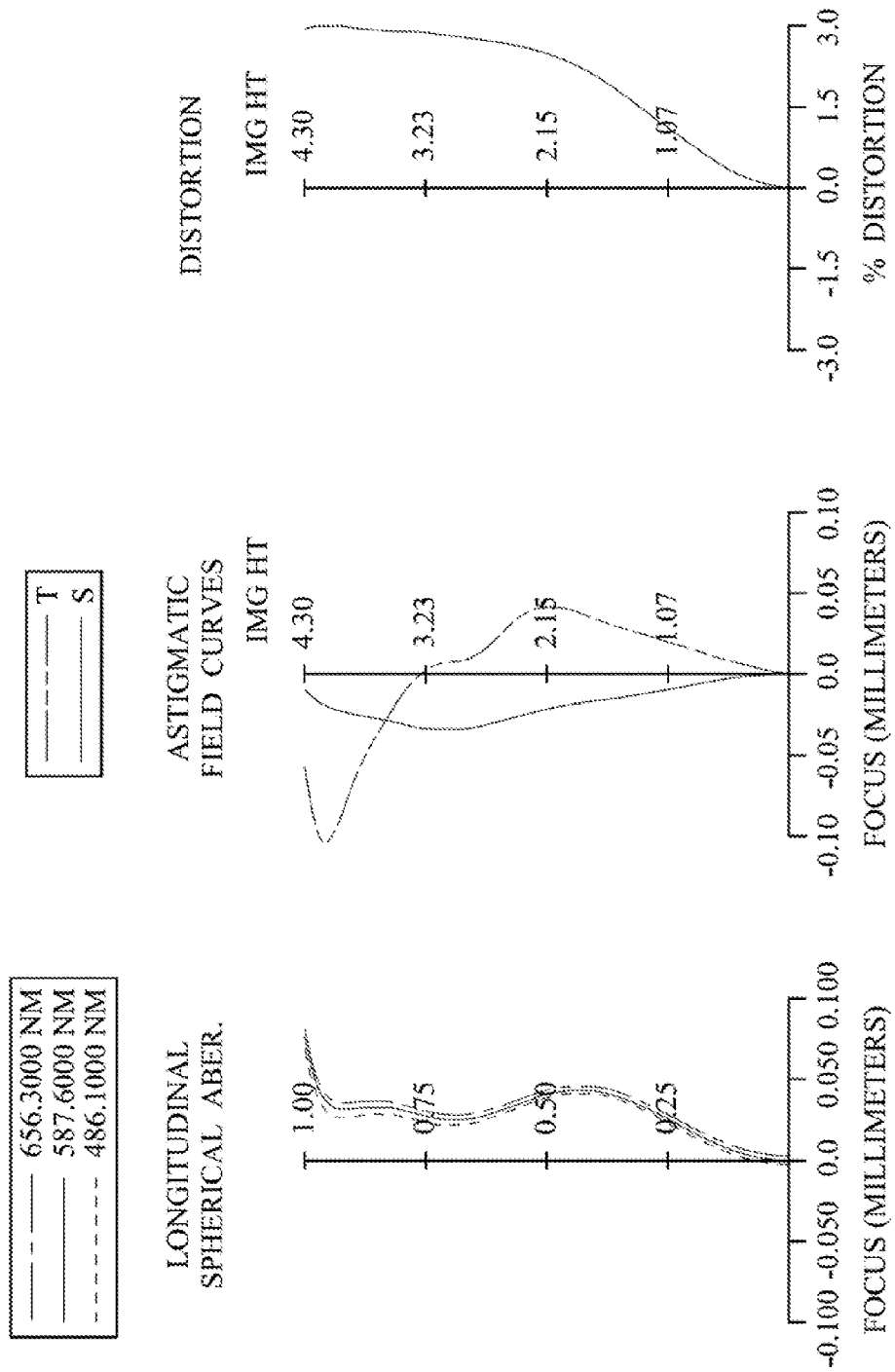
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the optical imaging lens system (not otherwise herein labeled) of the present disclosure and an image sensor 190. The optical imaging lens system includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170, wherein the optical imaging lens system has a total of six lens elements (110-160) with refractive power.

The first lens element 110 with positive refractive power has a convex object-side surface 111 and a concave image-side surface 112, which are both aspheric, and the first lens element 110 is made of plastic material.

The second lens element 120 with positive refractive power has a convex object-side surface 121 and a concave image-side surface 122, which are both aspheric, and the second lens element 120 is made of plastic material. Specifically, the second lens element 120 has the object-side surface 121 being convex in a paraxial region thereof, wherein the object-side surface 121 of the second lens element 120 has at least one concave shape in an off-axis region thereof. The second lens element 120 has the image-side surface 122 being concave in a paraxial region thereof, wherein the image-side surface 122 of the second lens element 120 has at least one convex shape in an off-axis region thereof.

The third lens element 130 with positive refractive power has a convex object-side surface 131 and a convex image-side surface 132, which are both aspheric, and the third lens element 130 is made of plastic material.

The fourth lens element 140 with negative refractive power has a concave object-side surface 141 and a convex image-side surface 142, which are both aspheric, and the fourth lens element 140 is made of plastic material.

The fifth lens element 150 with positive refractive power has a convex object-side surface 151 and a convex image-side surface 152, which are both aspheric, and the fifth lens element 150 is made of plastic material.

The sixth lens element 160 with negative refractive power has a convex object-side surface 161 and a concave image-side surface 162, which are both aspheric, and the sixth lens element 160 is made of plastic material. Specifically, the sixth lens element 160 has the object-side surface 161 being convex in a paraxial region thereof, wherein the object-side surface 161 of the sixth lens element 160 has at least one concave shape in an off-axis region thereof. The sixth lens element 160 has the image-side surface 162 being concave in a paraxial region thereof, wherein the image-side surface 162 of the sixth lens element 160 has at least one convex shape in an off-axis region thereof. Moreover, both of the object-side surface 161 and the image-side surface 162 of the sixth lens element 160 have at least one inflection point.

The IR-cut filter 180 is made of glass and located between the sixth lens element 160 and the image plane 170, and will not affect the focal length of the optical imaging lens system. The image sensor 190 is disposed on the image plane 170 of the optical imaging lens system.

The equation of the aspheric surface profiles of the aforementioned lens elements of the 1st embodiment is expressed as follows:

$$X(Y) = (Y^2/R)/(1 + sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical imaging lens system of the image capturing device according to the 1st embodiment, when a focal length of the optical imaging lens system is f, an f-number of the optical imaging lens system is Fno, and half of a maximal field of view of the optical imaging lens system is HFOV, these parameters have the following values: f=4.06 mm; Fno=2.00; and HFOV=45.7 degrees.

In the optical imaging lens system of the image capturing device according to the 1st embodiment, when an Abbe number of the second lens element 120 is V2, an Abbe number of the third lens element 130 is V3, and an Abbe number of the fourth lens element 140 is V4, the following conditions are satisfied: V2=55.9; and V3−V4=32.6.

In the optical imaging lens system of the image capturing device according to the 1st embodiment, when an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: (T45+T56)/T34=0.23.

In the optical imaging lens system of the image capturing device according to the 1st embodiment, when a curvature radius of the object-side surface 131 of the third lens element 130 is R5, a curvature radius of the image-side surface 132 of the third lens element 130 is R6, a curvature radius of the object-side surface 151 of the fifth lens element 150 is R9, and a curvature radius of the image-side surface 152 of the fifth lens element 150 is R10, the following conditions are satisfied: R5/R6=−1.64; and R9/R10=−0.51.

In the optical imaging lens system of the image capturing device according to the 1st embodiment, when the focal length of the optical imaging lens system is f, a focal length of the first lens element 110 is f1, a focal length of the second lens element 120 is f2, a focal length of the fourth lens element 140 is f4, and a focal length of the fifth lens element 150 is f5, the following conditions are satisfied: |f/f4|+f/f5=2.64; f5/f2=0.15; f/f1=0.12; and f/f2=0.18.

In the optical imaging lens system of the image capturing device according to the 1st embodiment, when a maximal field of view of the optical imaging lens system is FOV, the following condition is satisfied: FOV=91.4 degrees.

In the optical imaging lens system of the image capturing device according to the 1st embodiment, when an axial distance between the aperture stop 100 and the image plane 170 is SL, an axial distance between the object-side surface 111 of the first lens element 110 and the image plane 170 is TTL, and a maximum image height of the optical imaging lens system is ImgH, the following conditions are satisfied: SL/TTL=0.98; and TTL/ImgH=1.47.

The detailed optical data of the 1st embodiment are shown in Table 1 and the aspheric surface data are shown in Table 2 below.

TABLE 1

1st Embodiment
f = 4.06 mm, Fno = 2.00, HFOV = 45.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.120 | | | | |
| 2 | Lens 1 | 3.200 | ASP | 0.398 | Plastic | 1.544 | 55.9 | 33.18 |
| 3 | | 3.719 | ASP | 0.149 | | | | |
| 4 | Lens 2 | 2.207 | ASP | 0.380 | Plastic | 1.544 | 55.9 | 22.11 |
| 5 | | 2.539 | ASP | 0.254 | | | | |
| 6 | Lens 3 | 6.116 | ASP | 0.923 | Plastic | 1.544 | 55.9 | 4.40 |
| 7 | | −3.721 | ASP | 0.475 | | | | |
| S | Lens 4 | −0.812 | ASP | 0.394 | Plastic | 1.640 | 23.3 | −2.84 |
| 9 | | −1.746 | ASP | 0.050 | | | | |
| 10 | Lens 5 | 2.655 | ASP | 0.865 | Plastic | 1.544 | 55.9 | 3.36 |
| 11 | | −5.179 | ASP | 0.060 | | | | |
| 12 | Lens 6 | 1.421 | ASP | 0.545 | Plastic | 1.544 | 55.9 | −43.60 |
| 13 | | 1.160 | ASP | 1.200 | | | | |
| 14 | IR-cut filter | Plano | | 0.375 | Glass | 1.517 | 64.2 | — |
| 15 | | Plano | | 0.395 | | | | |
| 16 | Image | Plano | | — | | | | |

Note:
Reference wavelength is 587.6 nm (d-line).

TABLE 2

| Aspheric Coefficients | | | | | | |
|---|---|---|---|---|---|---|
| Surface # | 2 | 3 | 4 | 5 | 6 | 7 |
| k = | −1.1144E+00 | −1.0513E+00 | −4.4327E+00 | −4.3244E+00 | −2.1236E−01 | 4.0652E+00 |
| A4 = | −2.0834E−02 | −9.2928E−02 | −6.6655E−02 | −2.3987E−02 | −3.2200E−02 | −1.7052E−02 |
| A6 = | 1.2558E−02 | 4.8888E−02 | 4.0020E−02 | −3.1049E−03 | −4.6754E−03 | −1.8263E−02 |
| A8 = | 3.6151E−02 | −3.7445E−02 | −2.0628E−02 | 1.0888E−02 | 1.1740E−02 | −7.4050E−03 |
| A10 = | −1.3596E−01 | −9.6573E−03 | −4.0984E−02 | −2.3406E−02 | −2.5209E−02 | 2.2359E−02 |
| A12 = | 1.3331E−01 | 7.7400E−03 | 4.1669E−02 | 1.3295E−02 | 1.1029E−02 | −1.3812E−02 |
| A14 = | −4.6821E−02 | −1.7595E−03 | −1.5903E−02 | −3.2276E−03 | −1.2511E−03 | 2.7955E−03 |
| Surface # | 8 | 9 | 10 | 11 | 12 | 13 |
| k = | −1.3509E+00 | −1.6264E+00 | −1.3564E+01 | −8.8205E+00 | −2.4409E+00 | −1.8131E+00 |
| A4 = | 2.3182E−01 | 5.5705E−02 | 9.3293E−03 | 5.5196E−02 | −4.4831E−02 | −7.1533E−02 |
| A6 = | −4.2135E−01 | −1.0586E−01 | 2.3567E−03 | −1.2027E−02 | −6.2553E−03 | 1.3510E−02 |
| A8 = | 4.2454E−01 | 8.7736E−02 | −3.4171E−03 | −7.4326E−05 | 3.7667E−03 | −1.5594E−03 |
| A10 = | −2.2083E−01 | −3.1551E−02 | 9.0828E−04 | 3.6704E−04 | −5.4845E−04 | 1.1445E−04 |
| A12 = | 5.8851E−02 | 5.3648E−03 | −1.2427E−04 | −5.4319E−05 | 3.4249E−05 | −4.9912E−06 |
| A14 = | −6.4453E−03 | −3.5657E−04 | 6.6753E−06 | 2.5412E−06 | −7.9687E−07 | 9.6113E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
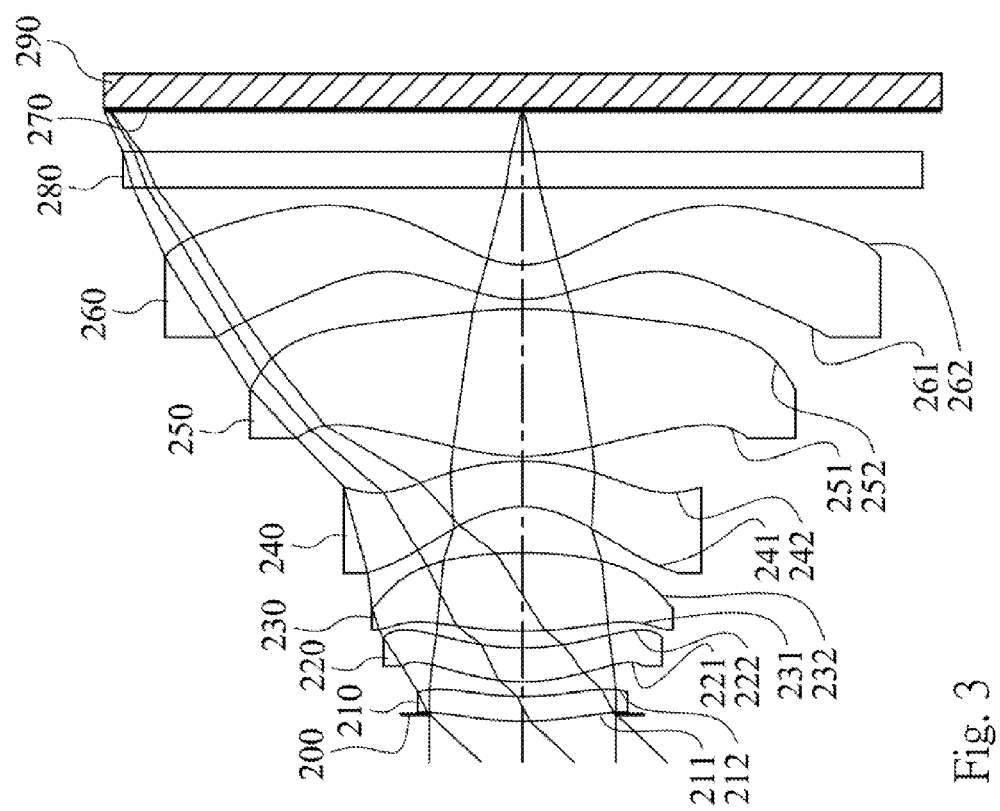
FIG. 3 is a schematic view of an image capturing device according to the 2nd embodiment of the present disclosure.
Figure 4:
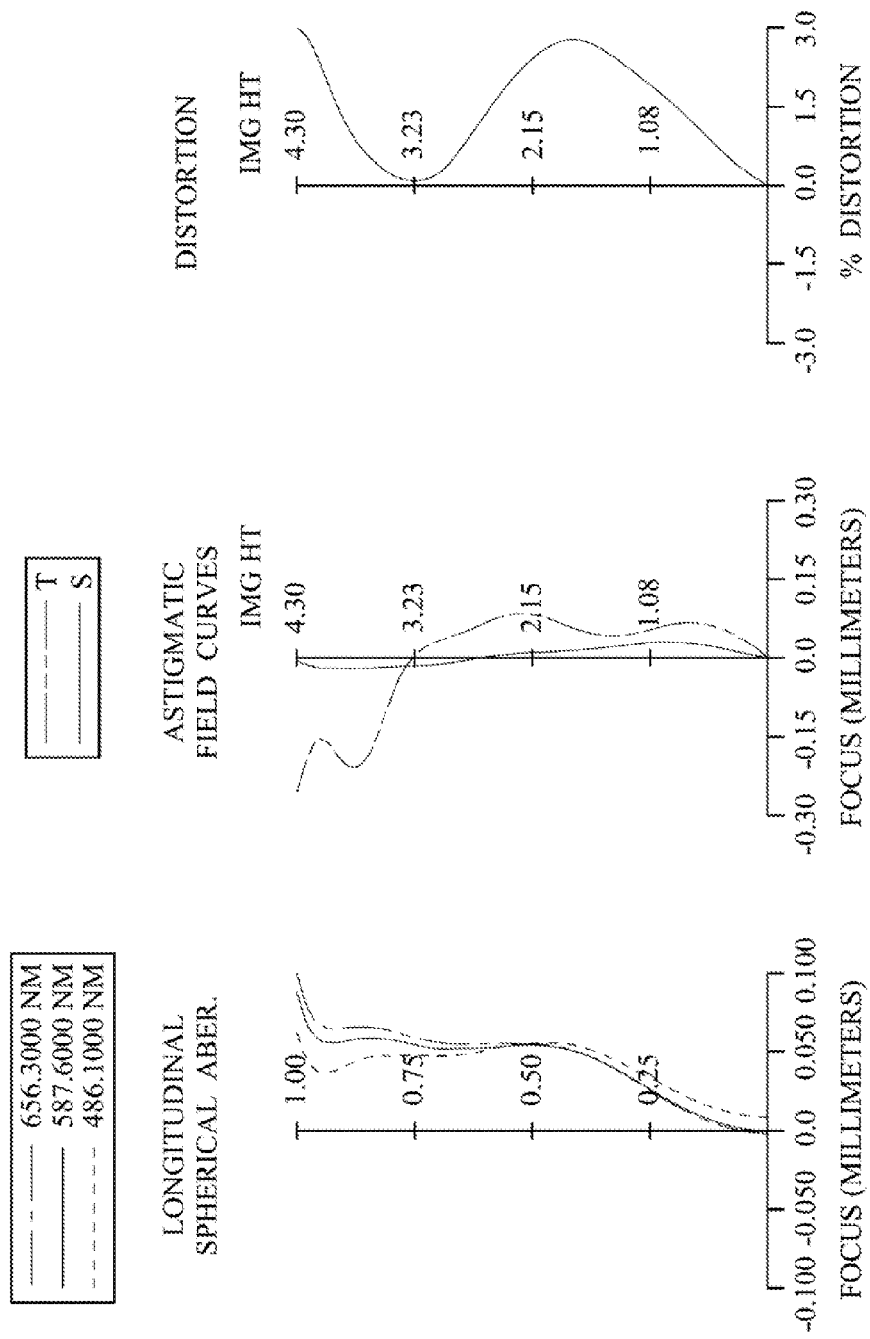
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the optical imaging lens system (not otherwise herein labeled) of the present disclosure and an image sensor 290. The optical imaging lens system includes, in order from an object side to an image side, an aperture stop 200, a first lens element 210, a second lens element 220, a third lens element 230, a fourth lens element 240, a fifth lens element 250, a sixth lens element 260, an IR-cut filter 280 and an image plane 270, wherein the optical imaging lens system has a total of six lens elements (210-260) with refractive power.

The first lens element 210 with negative refractive power has a convex object-side surface 211 and a concave image-side surface 212, which are both aspheric, and the first lens element 210 is made of plastic material.

The second lens element 220 with positive refractive power has a convex object-side surface 221 and a concave image-side surface 222, which are both aspheric, and the second lens element 220 is made of plastic material. Specifically, the second lens element 220 has the object-side surface 221 being convex in a paraxial region thereof, wherein the object-side surface 221 of the second lens element 220 has at least one concave shape in an off-axis region thereof. The second lens element 220 has the image-side surface 222 being concave in a paraxial region thereof, wherein the image-side surface 222 of the second lens element 220 has at least one convex shape in an off-axis region thereof.

The third lens element 230 with positive refractive power has a convex object-side surface 231 and a convex image-side surface 232, which are both aspheric, and the third lens element 230 is made of plastic material.

The fourth lens element 240 with negative refractive power has a concave object-side surface 241 and a convex image-side surface 242, which are both aspheric, and the fourth lens element 240 is made of plastic material.

The fifth lens element 250 with positive refractive power has a convex object-side surface 251 and a convex image-side surface 252, which are both aspheric, and the fifth lens element 250 is made of plastic material.

The sixth lens element 260 with negative refractive power has a convex object-side surface 261 and a concave image-side surface 262, which are both aspheric, and the sixth lens element 260 is made of plastic material. Specifically, the sixth lens element 260 has the object-side surface 261 being convex in a paraxial region thereof, wherein the object-side surface 261 of the sixth lens element 260 has at least one concave shape in an off-axis region thereof. The sixth lens element 260 has the image-side surface 262 being concave in a paraxial region thereof, wherein the image-side surface 262 of the sixth lens element 260 has at least one convex shape in an off-axis region thereof. Moreover, both of the object-side surface 261 and the image-side surface 262 of the sixth lens element 260 have at least one inflection point.

The IR-cut filter 280 is made of glass and located between the sixth lens element 260 and the image plane 270, and will not affect the focal length of the optical imaging lens system. The image sensor 290 is disposed on the image plane 270 of the optical imaging lens system.

The detailed optical data of the 2nd embodiment are shown in Table 3 and the aspheric surface data are shown in Table 4 below.

TABLE 3

2nd Embodiment
f = 3.87 mm, Fno = 2.00, HFOV = 47.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.070 | | | | |
| 2 | Lens 1 | 3.487 ASP | 0.255 | Plastic | 1.632 | 23.4 | −37.09 |
| 3 | | 2.949 ASP | 0.147 | | | | |
| 4 | Lens 2 | 1.869 ASP | 0.356 | Plastic | 1.544 | 55.9 | 12.59 |
| 5 | | 2.397 ASP | 0.176 | | | | |
| 6 | Lens 3 | 3.706 ASP | 0.809 | Plastic | 1.544 | 55.9 | 3.84 |
| 7 | | −4.417 ASP | 0.486 | | | | |
| 8 | Lens 4 | −0.928 ASP | 0.467 | Plastic | 1.640 | 23.3 | −2.88 |
| 9 | | −2.238 ASP | 0.050 | | | | |
| 10 | Lens 5 | 2.036 ASP | 1.538 | Plastic | 1.544 | 55.9 | 2.79 |
| 11 | | −4.352 ASP | 0.099 | | | | |
| 12 | Lens 6 | 1.375 ASP | 0.359 | Plastic | 1.607 | 26.6 | −7.45 |
| 13 | | 0.950 ASP | 0.800 | | | | |
| 14 | IR-cut filter | Plano | 0.375 | Glass | 1.517 | 64.2 | — |
| 15 | | Plano | 0.435 | | | | |
| 16 | Image | Plano | — | | | | |

Note:
Reference wavelength is 587.6 nm (d-line).

TABLE 4

| | Aspheric Coefficients | | | | | |
|---|---|---|---|---|---|---|
| Surface # | 2 | 3 | 4 | 5 | 6 | 7 |
| k = | −4.4137E+00 | −4.1975E+00 | −3.8041E+00 | −4.6939E+00 | −2.7450E−02 | 3.6247E+00 |
| A4 = | −3.1992E−02 | −1.0220E−01 | −5.5054E−02 | −2.3540E−02 | −3.3960E−02 | 3.5762E−03 |
| A6 = | 2.2143E−03 | 5.4128E−02 | 5.2899E−02 | 1.1852E−03 | −9.5768E−03 | −2.3037E−02 |
| A8 = | 3.0714E−02 | −5.2579E−02 | −2.2095E−02 | 1.2740E−02 | 1.2717E−02 | −9.5662E−03 |
| A10 = | −1.3239E−01 | −9.0412E−04 | −4.3465E−02 | −2.4141E−02 | −2.4330E−02 | 2.1658E−02 |
| A12 = | 1.4023E−01 | 7.7400E−03 | 4.3289E−02 | 1.2678E−02 | 1.0971E−02 | −1.3847E−02 |
| A14 = | −5.3363E−02 | −1.7595E−03 | −1.4604E−02 | −2.7779E−03 | −1.2536E−03 | 2.8439E−03 |
| Surface # | 8 | 9 | 10 | 11 | 12 | 13 |
| k = | −1.5108E+00 | −1.8885E+00 | −1.0951E+01 | −2.6475E−01 | −3.6611E+00 | −2.3829E+00 |
| A4 = | 2.3931E−01 | 5.8079E−02 | −8.9732E−03 | 4.4883E−02 | −4.9741E−02 | −6.3360E−02 |
| A6 = | −4.2108E−01 | −1.0435E−01 | 4.8719E−03 | −1.0181E−02 | −6.2306E−03 | 1.1908E−02 |
| A8 = | 4.2400E−01 | 8.8102E−02 | −3.0079E−03 | 3.8949E−05 | 3.7954E−03 | −1.4815E−03 |
| A10 = | −2.2113E−01 | −3.1489E−02 | 8.7102E−04 | 3.5471E−04 | −5.4785E−04 | 1.1690E−04 |
| A12 = | 5.8817E−02 | 5.3666E−03 | −1.3138E−04 | −5.5686E−05 | 3.4242E−05 | −4.9938E−06 |
| A14 = | −6.3618E−03 | −3.6618E−04 | 7.1031E−06 | 2.5418E−06 | −8.0818E−07 | 8.4232E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd embodiment | | | |
|---|---|---|---|
| f [mm] | 3.87 | |f/f4| + f/f5 | 2.73 |
| Fno | 2.00 | f5/f2 | 0.22 |
| HFOV [deg.] | 47.0 | f/f1 | −0.10 |
| V2 | 55.9 | f/f2 | 0.31 |
| V3 − V4 | 32.6 | FOV [deg.] | 94.0 |
| (T45 + T56)/T34 | 0.31 | SL/TTL | 0.99 |
| R5/R6 | −0.84 | TTL/ImgH | 1.45 |
| R9/R10 | −0.47 | | |

3rd Embodiment

Figure 5:
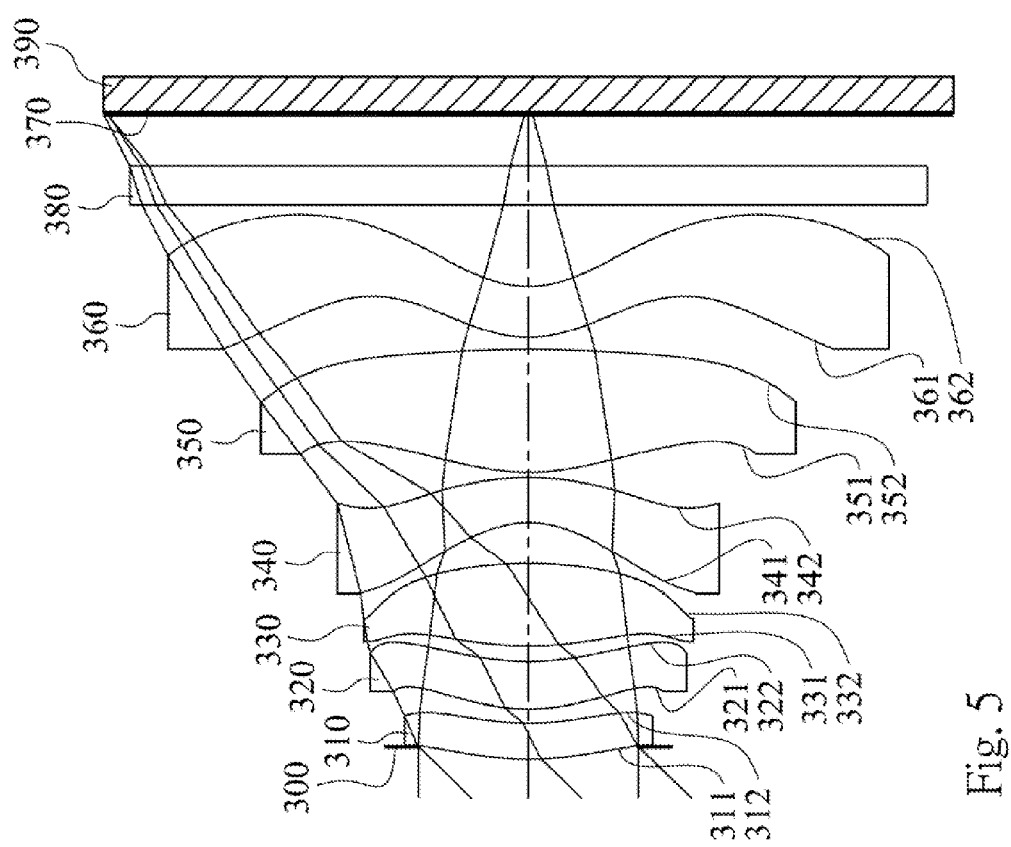
FIG. 5 is a schematic view of an image capturing device according to the 3rd embodiment of the present disclosure.
Figure 6:
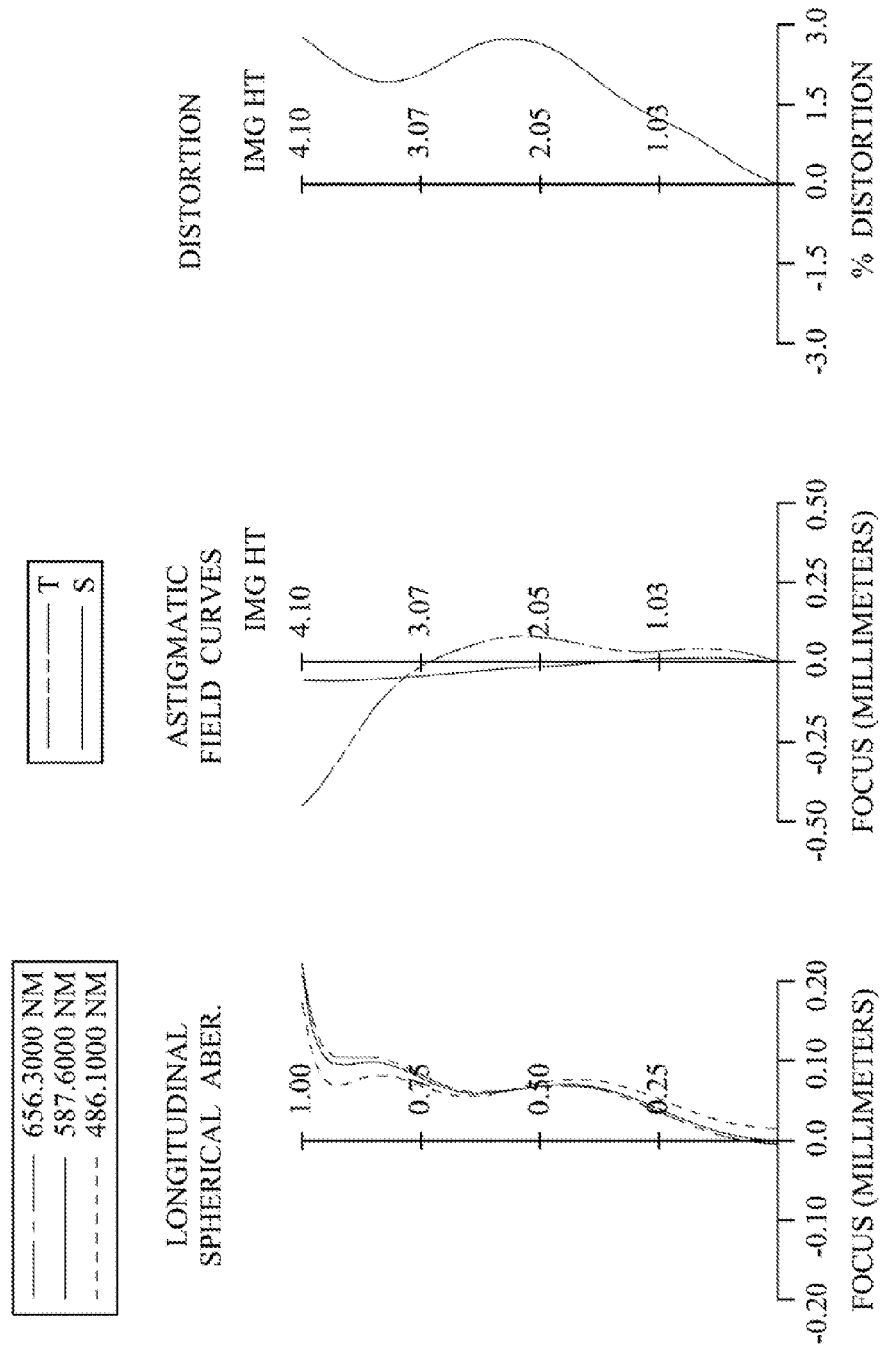
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the optical imaging lens system (not otherwise herein labeled) of the present disclosure and an image sensor 390. The optical imaging lens system includes, in order from an object side to an image side, an aperture stop 300, a first lens element 310, a second lens element 320, a third lens element 330, a fourth lens element 340, a fifth lens element 350, a sixth lens element 360, an IR-cut filter 380 and an image plane 370, wherein the optical imaging lens system has a total of six lens elements (310-360) with refractive power.

The first lens element 310 with negative refractive power has a convex object-side surface 311 and a concave image-side surface 312, which are both aspheric, and the first lens element 310 is made of plastic material.

The second lens element 320 with positive refractive power has a convex object-side surface 321 and a concave image-side surface 322, which are both aspheric, and the second lens element 320 is made of plastic material. Specifically, the second lens element 320 has the object-side surface 321 being convex in a paraxial region thereof, wherein the object-side surface 321 of the second lens element 320 has at least one concave shape in an off-axis region thereof. The second lens element 320 has the image-side surface 322 being concave in a paraxial region thereof, wherein the image-side surface 322 of the second lens element 320 has at least one convex shape in an off-axis region thereof.

The third lens element 330 with positive refractive power has a convex object-side surface 331 and a convex image-side surface 332, which are both aspheric, and the third lens element 330 is made of plastic material.

The fourth lens element 340 with negative refractive power has a concave object-side surface 341 and a convex image-side surface 342, which are both aspheric, and the fourth lens element 340 is made of plastic material.

The fifth lens element 350 with positive refractive power has a convex object-side surface 351 and a convex image-side surface 352, which are both aspheric, and the fifth lens element 350 is made of plastic material.

The sixth lens element 360 with positive refractive power has a convex object-side surface 361 and a concave image-side surface 362, which are both aspheric, and the sixth lens element 360 is made of plastic material. Specifically, the sixth lens element 360 has the object-side surface 361 being convex in a paraxial region thereof, wherein the object-side surface 361 of the sixth lens element 360 has at least one concave shape in an off-axis region thereof. The sixth lens element 360 has the image-side surface 362 being concave in a paraxial region thereof, wherein the image-side surface 362 of the sixth lens element 360 has at least one convex shape in an off-axis region thereof. Moreover, both of the object-side surface 361 and the image-side surface 362 of the sixth lens element 360 have at least one inflection point.

The IR-cut filter 380 is made of glass and located between the sixth lens element 360 and the image plane 370, and will not affect the focal length of the optical imaging lens system. The image sensor 390 is disposed on the image plane 370 of the optical imaging lens system.

The detailed optical data of the 3rd embodiment are shown in Table 5 and the aspheric surface data are shown in Table 6 below.

TABLE 5

3rd Embodiment
f = 3.86 mm, Fno = 1.80, HFOV = 45.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.120 | | | | |
| 2 | Lens 1 | 3.148 | ASP | 0.350 | Plastic | 1.650 | 21.4 | −25.11 |
| 3 | | 2.523 | ASP | 0.136 | | | | |
| 4 | Lens 2 | 1.891 | ASP | 0.467 | Plastic | 1.535 | 55.7 | 10.25 |
| 5 | | 2.638 | ASP | 0.150 | | | | |
| 6 | Lens 3 | 3.402 | ASP | 0.801 | Plastic | 1.535 | 55.7 | 3.59 |
| 7 | | −4.052 | ASP | 0.402 | | | | |
| 8 | Lens 4 | −0.938 | ASP | 0.436 | Plastic | 1.634 | 23.8 | −2.45 |
| 9 | | −2.793 | ASP | 0.050 | | | | |
| 10 | Lens 5 | 2.111 | ASP | 1.200 | Plastic | 1.535 | 55.7 | 3.37 |
| 11 | | −9.912 | ASP | 0.118 | | | | |
| 12 | Lens 6 | 1.140 | ASP | 0.499 | Plastic | 1.535 | 55.7 | 73.04 |
| 13 | | 0.995 | ASP | 0.800 | | | | |
| 14 | IR-cut filter | Plano | | 0.375 | Glass | 1.517 | 64.2 | — |
| 15 | | Plano | | 0.511 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −4.7616E+00 | −4.5752E+00 | −4.7472E+00 | −4.7010E+00 | 5.5303E−01 | −1.3484E−01 |
| A4 = | −2.8809E−02 | −9.5879E−02 | −5.1132E−02 | −2.6763E−02 | −3.1895E−02 | 1.4497E−02 |
| A6 = | 1.9233E−02 | 7.1900E−02 | 5.8078E−02 | 1.1895E−03 | −8.3628E−03 | −2.2396E−02 |
| A8 = | 3.7019E−02 | −5.7125E−02 | −1.8297E−02 | 1.3444E−02 | 1.2984E−02 | −1.0336E−02 |
| A10 = | −1.4110E−01 | 3.3843E−03 | −4.5308E−02 | −2.3065E−02 | −2.4494E−02 | 2.1454E−02 |
| A12 = | 1.3197E−01 | 7.4625E−03 | 3.9601E−02 | 1.3175E−02 | 1.0799E−02 | −1.3808E−02 |
| A14 = | −4.2089E−02 | −2.0930E−03 | −1.1122E−02 | −2.7996E−03 | −1.2856E−03 | 2.8358E−03 |

| Surface # | 8 | 9 | 10 | 11 | 12 | 13 |
|---|---|---|---|---|---|---|
| k = | −1.5741E+00 | −9.9539E−01 | −7.5784E+00 | 9.9431E+00 | −2.5953E+00 | −2.0305E+00 |
| A4 = | 2.3975E−01 | 5.2933E−02 | −1.9590E−02 | 1.9590E−02 | −5.1152E−02 | −6.6015E−02 |
| A6 = | −4.2196E−01 | −1.0437E−01 | 6.4936E−03 | −5.7727E−03 | −6.9720E−03 | 1.2690E−02 |
| A8 = | 4.2327E−01 | 8.8171E−02 | −2.9731E−03 | −1.2949E−04 | 3.8485E−03 | −1.5511E−03 |
| A10 = | −2.2143E−01 | −3.1506E−02 | 8.0798E−04 | 3.1061E−04 | −5.4599E−04 | 1.1646E−04 |
| A12 = | 5.8856E−02 | 5.3667E−03 | −1.3374E−04 | −5.5382E−05 | 3.4390E−05 | −4.8457E−06 |
| A14 = | −6.2613E−02 | −3.6382E−04 | 8.5005E−06 | 3.1113E−06 | −8.2638E−07 | 8.3339E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd embodiment | | | |
|---|---|---|---|
| f [mm] | 3.86 | |f/f4| + f/f5 | 2.72 |
| Fno | 1.80 | f5/f2 | 0.33 |
| HFOV [deg.] | 45.6 | f/f1 | −0.15 |
| V2 | 55.7 | f/f2 | 0.38 |
| V3 − V4 | 31.9 | FOV [deg.] | 91.2 |
| (T45 + T56)/T34 | 0.42 | SL/TTL | 0.98 |
| R5/R6 | −0.84 | TTL/ImgH | 1.50 |
| R9/R10 | −0.21 | | |

4th Embodiment

Figure 7:
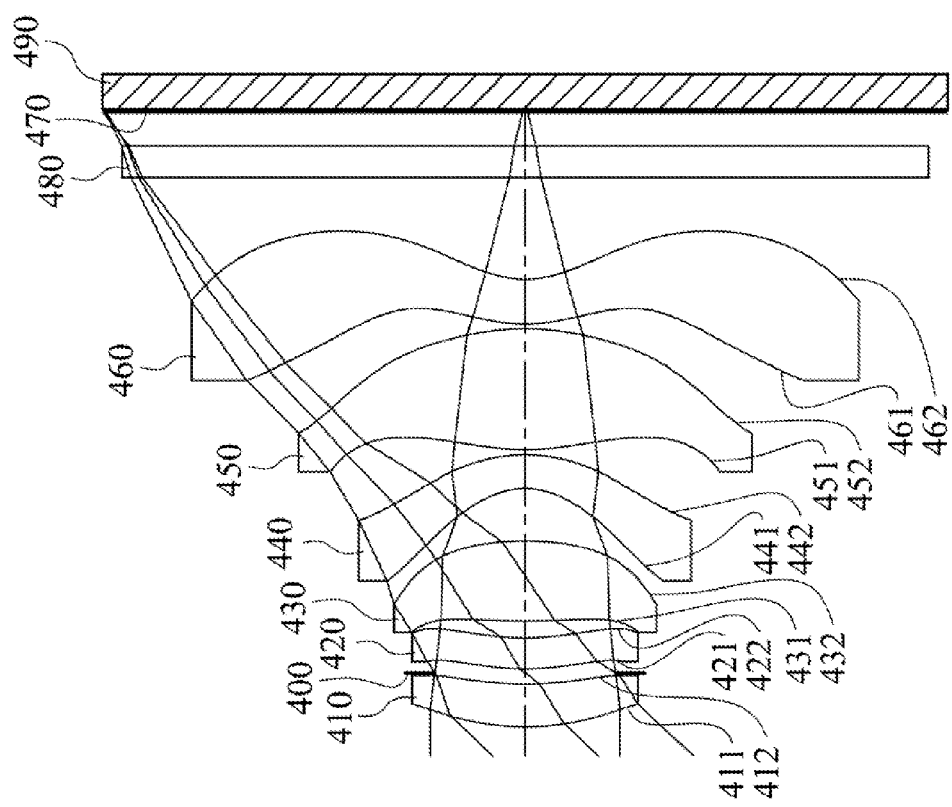
FIG. 7 is a schematic view of an image capturing device according to the 4th embodiment of the present disclosure.
Figure 8:
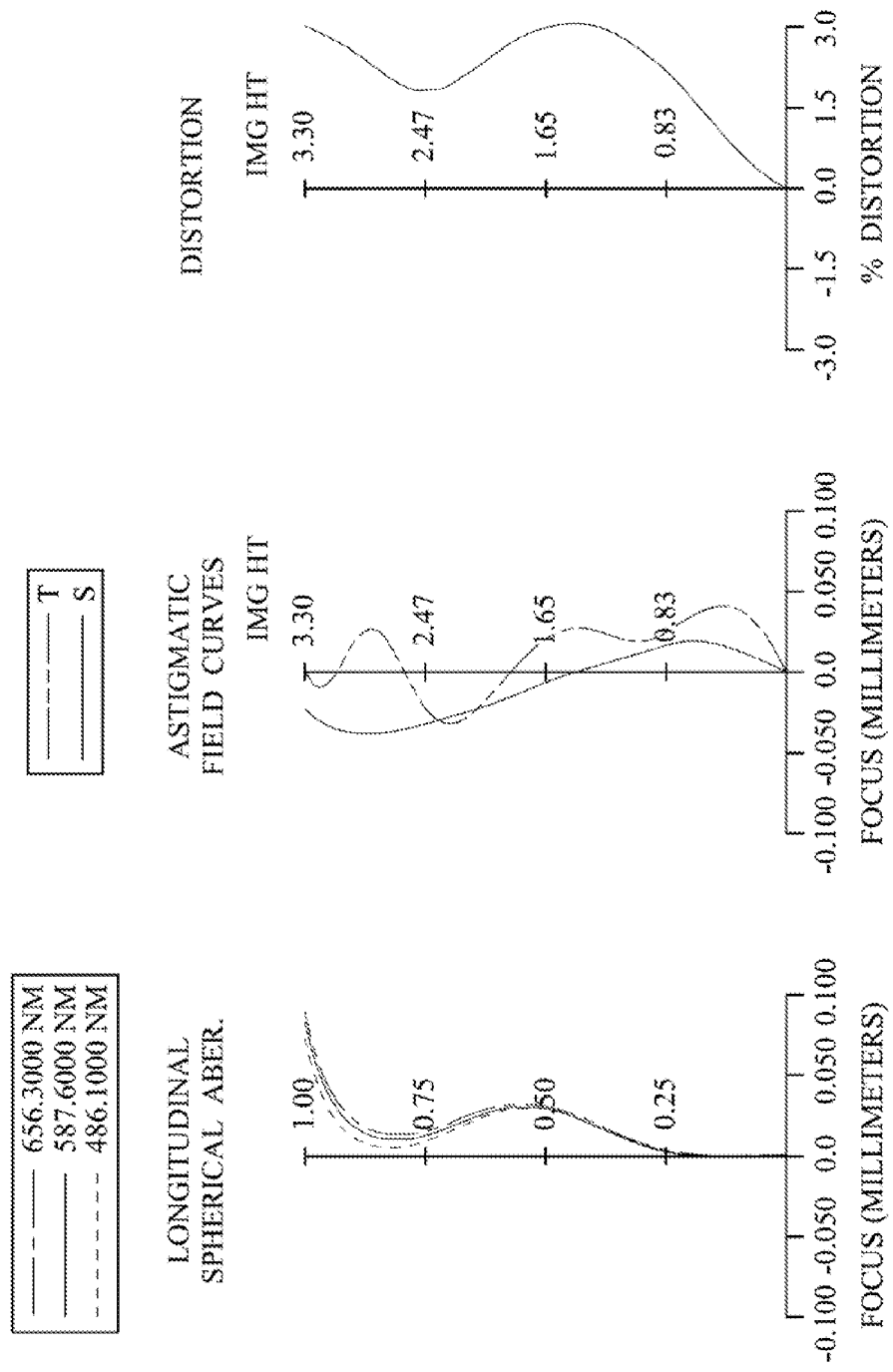
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the optical imaging lens system (not otherwise herein labeled) of the present disclosure and an image sensor 490. The optical imaging lens system includes, in order from an object side to an image side, a first lens element 410, an aperture stop 400, a second lens element 420, a third lens element 430, a fourth lens element 440, a fifth lens element 450, a sixth lens element 460, an IR-cut filter 480 and an image plane 470, wherein the optical imaging lens system has a total of six lens elements (410-460) with refractive power.

The first lens element 410 with positive refractive power has a convex object-side surface 411 and a concave image-side surface 412, which are both aspheric, and the first lens element 410 is made of plastic material.

The second lens element 420 with positive refractive power has a convex object-side surface 421 and a concave image-side surface 422, which are both aspheric, and the second lens element 420 is made of plastic material. Specifically, the second lens element 420 has the object-side surface 421 being convex in a paraxial region thereof, wherein the object-side surface 421 of the second lens element 420 has at least one concave shape in an off-axis region thereof. The second lens element 420 has the image-side surface 422 being concave in a paraxial region thereof, wherein the image-side surface 422 of the second lens element 420 has at least one convex shape in an off-axis region thereof.

The third lens element 430 with positive refractive power has a convex object-side surface 431 and a convex image-side surface 432, which are both aspheric, and the third lens element 430 is made of plastic material.

The fourth lens element 440 with negative refractive power has a concave object-side surface 441 and a convex image-side surface 442, which are both aspheric, and the fourth lens element 440 is made of plastic material.

The fifth lens element 450 with positive refractive power has a convex object-side surface 4451 and a convex image-side surface 452, which are both aspheric, and the fifth lens element 450 is made of plastic material.

The sixth lens element 460 with negative refractive power has a convex object-side surface 461 and a concave image-side surface 462, which are both aspheric, and the sixth lens element 460 is made of plastic material. Specifically, the sixth lens element 460 has the object-side surface 461 being convex in a paraxial region thereof, wherein the object-side surface 461 of the sixth lens element 460 has at least one concave shape in an off-axis region thereof. The sixth lens element 460 has the image-side surface 462 being concave in a paraxial region thereof, wherein the image-side surface 462 of the sixth lens element 460 has at least one convex shape in an off-axis region thereof. Moreover, both of the object-side surface 461 and the image-side surface 462 of the sixth lens element 460 have at least one inflection point.

The IR-cut filter 480 is made of glass and located between the sixth lens element 460 and the image plane 470, and will not affect the focal length of the optical imaging lens system. The image sensor 490 is disposed on the image plane 470 of the optical imaging lens system.

The detailed optical data of the 4th embodiment are shown in Table 7 and the aspheric surface data are shown in Table 8 below.

TABLE 7

4th Embodiment
f = 2.98 mm, Fno = 2.00, HFOV = 46.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.064 | ASP | 0.332 | Plastic | 1.544 | 55.9 | 16.67 |
| 2 | | 2.520 | ASP | 0.088 | | | | |
| 3 | Ape. Stop | Plano | | 0.031 | | | | |
| 4 | Lens 2 | 1.898 | ASP | 0.249 | Plastic | 1.544 | 55.9 | 28.92 |
| 5 | | 2.058 | ASP | 0.133 | | | | |
| 6 | Lens 3 | 6.029 | ASP | 0.630 | Plastic | 1.544 | 55.9 | 3.06 |
| 7 | | −2.211 | ASP | 0.413 | | | | |
| 8 | Lens 4 | −0.555 | ASP | 0.261 | Plastic | 1.640 | 23.3 | −1.90 |
| 9 | | −1.211 | ASP | 0.040 | | | | |
| 10 | Lens 5 | 1.701 | ASP | 0.952 | Plastic | 1.544 | 55.9 | 1.83 |
| 11 | | −1.941 | ASP | 0.041 | | | | |
| 12 | Lens 6 | 1.232 | ASP | 0.352 | Plastic | 1.544 | 55.9 | −4.99 |
| 13 | | 0.762 | ASP | 0.800 | | | | |
| 14 | IR-cut filter | Plano | | 0.250 | Glass | 1.517 | 64.2 | — |
| 15 | | Plano | | 0.276 | | | | |
| 16 | Image | Plano | | — | | | | |

Note:
Reference wavelength is 587.6 nm (d-line).

TABLE 8

Aspheric Coefficients

| Surface # | 1 | 2 | 4 | 5 | 6 | 7 |
|---|---|---|---|---|---|---|
| k = | 3.6431E+00 | 5.5687E+00 | −7.4098E+00 | −8.2635E+00 | −8.1777E+00 | 3.2111E+00 |
| A4 = | −1.6407E−02 | −2.0801E−01 | −1.8227E−01 | −1.0216E−01 | −1.1035E−01 | −5.4880E−02 |
| A6 = | −5.1037E−01 | 2.1120E−01 | 3.0807E−01 | −5.8104E−03 | −6.3541E−02 | −1.1469E−01 |
| A8 = | 2.1956E+00 | −2.4951E−01 | −4.1499E−01 | 1.2756E−01 | 2.0024E−01 | −1.6503E−01 |
| A10 = | −5.0614E+00 | −5.1629E−01 | −1.2805E+00 | −8.7987E−01 | −9.3174E−01 | 8.2499E−01 |
| A12 = | 5.4909E+00 | 6.6949E−01 | 3.5978E+00 | 1.2051E+00 | 7.9581E−01 | −1.1705E+00 |
| A14 = | −2.4536E+00 | −3.4243E−01 | −3.1115E+00 | −6.3003E−01 | −1.9019E−01 | 5.5937E−01 |

| Surface # | 8 | 9 | 10 | 11 | 12 | 13 |
|---|---|---|---|---|---|---|
| k = | −1.3014E+00 | −1.2989E+00 | −1.9838E+01 | 3.1404E−02 | −4.5648E+00 | −2.4685E+00 |
| A4 = | 7.1685E−01 | 1.7133E−01 | −5.5822E−02 | 1.1127E−01 | −1.8408E−01 | −2.1177E−01 |
| A6 = | −3.2577E+00 | −8.2047E−01 | 1.6607E−02 | −7.6656E−02 | −4.2432E−02 | 9.8369E−02 |
| A8 = | 7.2505E+00 | 1.4903E+00 | −4.2995E−02 | 2.2184E−03 | 6.4817E−02 | −2.7872E−02 |
| A10 = | −8.4987E+00 | −1.2113E+00 | 3.1979E−02 | 1.4271E−02 | −2.1092E−02 | 4.6505E−03 |

TABLE 8-continued

| Aspheric Coefficients | | | | | | |
|---|---|---|---|---|---|---|
| A12 = | 5.0713E+00 | 4.6641E−01 | −1.1343E−02 | −4.6606E−03 | 2.9442E−03 | −4.1997E−04 |
| A14 = | −1.1998E+00 | −6.9000E−02 | 1.4497E−03 | 5.0937E−04 | −1.5409E−04 | 1.5645E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th embodiment | | | |
|---|---|---|---|
| f [mm] | 2.98 | |f/f4| + f/f5 | 3.20 |
| Fno | 2.00 | f5/f2 | 0.06 |
| HFOV [deg.] | 46.9 | f/f1 | 0.18 |
| V2 | 55.9 | f/f2 | 0.10 |
| V3 − V4 | 32.6 | FOV [deg.] | 93.8 |
| (T45 + T56)/T34 | 0.20 | SL/TTL | 0.91 |
| R5/R6 | −2.73 | TTL/ImgH | 1.44 |
| R9/R10 | −0.88 | | |

5th Embodiment

Figure 9:
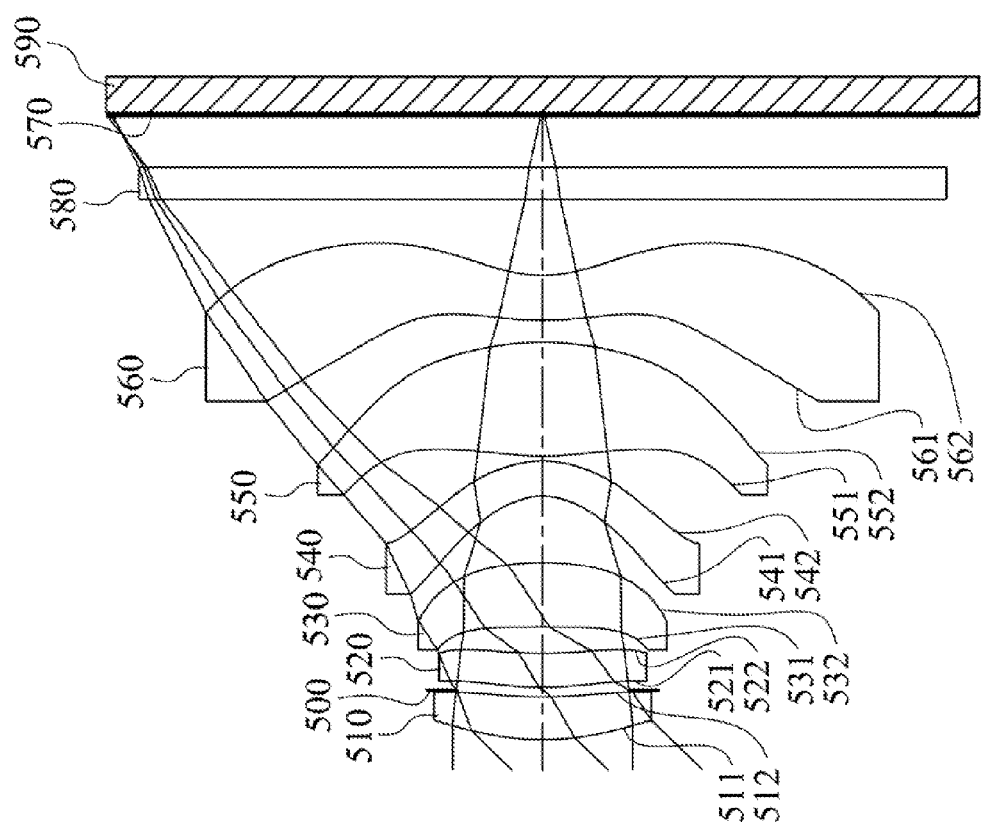
FIG. 9 is a schematic view of an image capturing device according to the 5th embodiment of the present disclosure.
Figure 10:
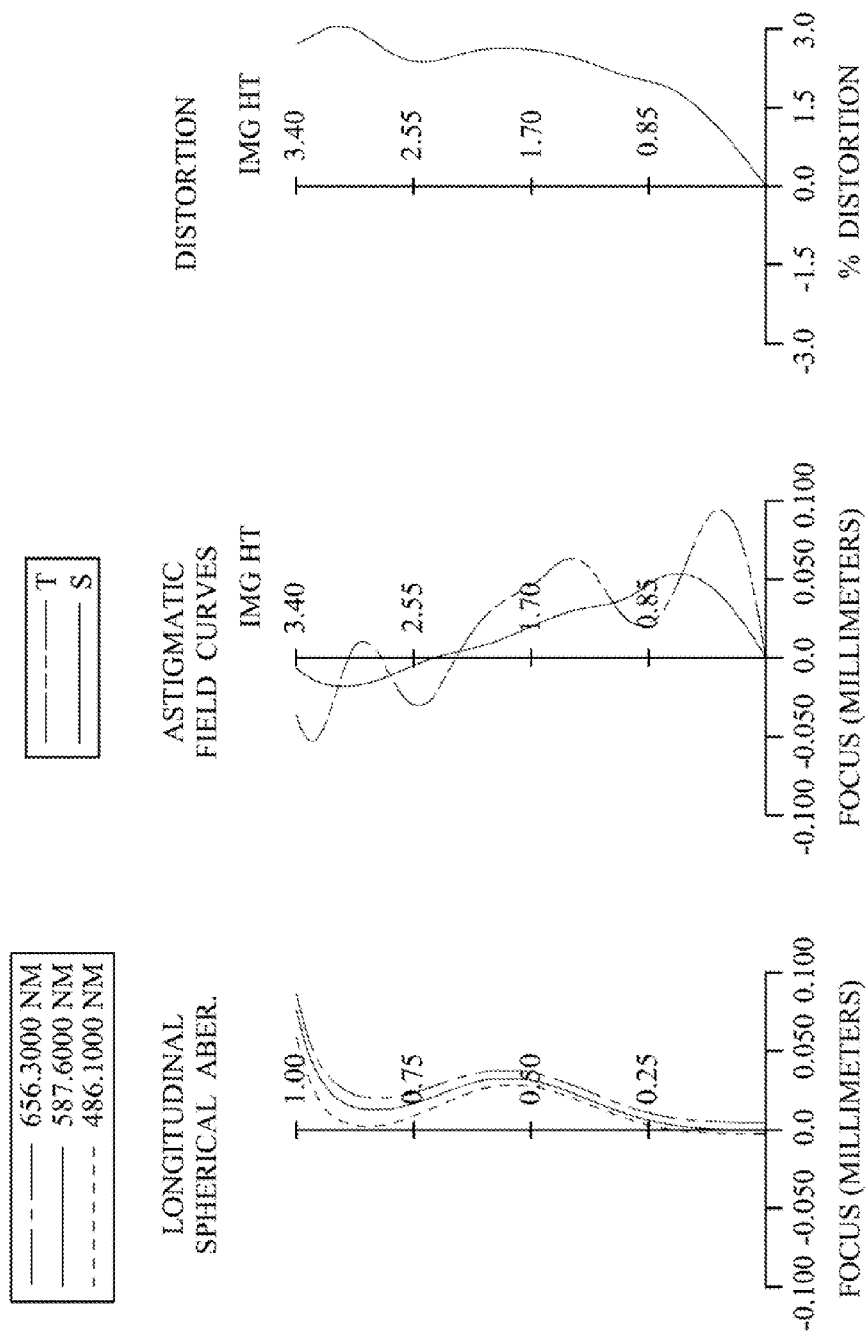
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the optical imaging lens system (not otherwise herein labeled) of the present disclosure and an image sensor 590. The optical imaging lens system includes, in order from an object side to an image side, a first lens element 510, an aperture stop 500, a second lens element 520, a third lens element 530, a fourth lens element 540, a fifth lens element 550, a sixth lens element 560, an IR-cut filter 580 and an image plane 570, wherein the optical imaging lens system has a total of six lens elements (510-560) with refractive power.

The first lens element 510 with positive refractive power has a convex object-side surface 511 and a concave image-side surface 512, which are both aspheric, and the first lens element 510 is made of plastic material.

The second lens element 520 with positive refractive power has a convex object-side surface 521 and a concave image-side surface 522, which are both aspheric, and the second lens element 520 is made of plastic material. Specifically, the second lens element 520 has the object-side surface 521 being convex in a paraxial region thereof, wherein the object-side surface 521 of the second lens element 520 has at least one concave shape in an off-axis region thereof. The second lens element 520 has the image-side surface 522 being concave in a paraxial region thereof, wherein the image-side surface 522 of the second lens element 520 has at least one convex shape in an off-axis region thereof.

The third lens element 530 with positive refractive power has a concave object-side surface 531 and a convex image-side surface 532, which are both aspheric, and the third lens element 530 is made of plastic material.

The fourth lens element 540 with negative refractive power has a concave object-side surface 541 and a convex image-side surface 542, which are both aspheric, and the fourth lens element 540 is made of plastic material.

The fifth lens element 550 with positive refractive power has a convex object-side surface 551 and a convex image-side surface 552, which are both aspheric, and the fifth lens element 550 is made of plastic material.

The sixth lens element 560 with negative refractive power has a convex object-side surface 561 and a concave image-side surface 562, which are both aspheric, and the sixth lens element 560 is made of plastic material. Specifically, the sixth lens element 560 has the object-side surface 561 being convex in a paraxial region thereof, wherein the object-side surface 561 of the sixth lens element 560 has at least one concave shape in an off-axis region thereof. The sixth lens element 560 has the image-side surface 562 being concave in a paraxial region thereof, wherein the image-side surface 562 of the sixth lens element 560 has at least one convex shape in an off-axis region thereof. Moreover, both of the object-side surface 561 and the image-side surface 562 of the sixth lens element 560 have at least one inflection point.

The IR-cut filter 580 is made of glass and located between the sixth lens element 560 and the image plane 570, and will not affect the focal length of the optical imaging lens system. The image sensor 590 is disposed on the image plane 570 of the optical imaging lens system.

The detailed optical data of the 5th embodiment are shown in Table 9 and the aspheric surface data are shown in Table 10 below.

TABLE 9

5th Embodiment
f = 3.19 mm, Fno = 2.25, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.240 | ASP | 0.332 | Plastic | 1.544 | 55.9 | 10.00 |
| 2 | | 3.610 | ASP | 0.053 | | | | |
| 3 | Ape. Stop | Plano | | 0.023 | | | | |
| 4 | Lens 2 | 2.631 | ASP | 0.271 | Plastic | 1.544 | 55.9 | 17.07 |
| 5 | | 3.537 | ASP | 0.208 | | | | |
| 6 | Lens 3 | −18.182 | ASP | 0.506 | Plastic | 1.544 | 55.9 | 4.28 |

TABLE 9-continued

5th Embodiment
f = 3.19 mm, Fno = 2.25, HFOV = 46.0 deg.

| Surface # | | Curvature Radius | | Thickness | Material | Index | Abbe # | Focal Length |
|---|---|---|---|---|---|---|---|---|
| 7 | | −2.085 | ASP | 0.524 | | | | |
| S | Lens 4 | −0.518 | ASP | 0.272 | Plastic | 1.650 | 21.4 | −2.84 |
| 9 | | −0.870 | ASP | 0.040 | | | | |
| 10 | Lens 5 | 2.093 | ASP | 0.897 | Plastic | 1.544 | 55.9 | 2.10 |
| 11 | | −2.135 | ASP | 0.176 | | | | |
| 12 | Lens 6 | 2.423 | ASP | 0.355 | Plastic | 1.607 | 26.6 | −3.43 |
| 13 | | 1.059 | ASP | 0.600 | | | | |
| 14 | IR-cut filter | Plano | | 0.250 | Glass | 1.517 | 64.2 | — |
| 15 | | Plano | | 0.416 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | 5.0130E+00 | 9.3528E+00 | −4.1587E+00 | −3.0906E+00 | −4.8762E+01 | 2.7974E+00 |
| A4 = | −2.7138E−02 | −1.8810E−01 | −1.9270E−01 | −1.1980E−01 | −1.3891E−01 | −5.9335E−02 |
| A6 = | −4.8602E−01 | 1.7854E−01 | 1.9847E−01 | −1.1991E−01 | −1.4781E−01 | −6.4448E−02 |
| A8 = | 2.0157E+00 | −2.7203E−01 | −2.7244E−01 | 1.8473E−01 | 1.8701E−01 | −2.1899E−01 |
| A10 = | −4.9877E+00 | −2.4545E−01 | −1.0717E+00 | −7.9758E−01 | −1.0144E+00 | 7.7495E−01 |
| A12 = | 5.9054E+00 | 6.6949E−01 | 3.5978E+00 | 1.1823E+00 | 5.6667E−01 | −1.1480E+00 |
| A14 = | −2.8992E+00 | −3.4243E−01 | −3.1115E+00 | −6.3003E−01 | 1.0068E−01 | 5.7482E−01 |

| Surface # | 8 | 9 | 10 | 11 | 12 | 13 |
|---|---|---|---|---|---|---|
| k = | −1.2269E+00 | −1.2722E+00 | −4.0669E+01 | 1.2318E−01 | −4.5022E+00 | −2.8181E+00 |
| A4 = | 7.0777E−01 | 1.6433E−01 | −7.0058E−02 | 8.4649E−02 | −1.7862E−01 | −2.0860E−01 |
| A6 = | −3.2601E+00 | −8.2845E−01 | 2.4952E−02 | −7.8245E−02 | −42498E−02 | 9.7990E−02 |
| A8 = | 7.2462E+00 | 1.4897E+00 | −4.7970E−02 | 2.6909E−03 | 6.4611E−02 | −2.7623E−02 |
| A10 = | −8.5001E+00 | −1.2096E+00 | 3.1283E−02 | 1.4558E−02 | −2.1128E−02 | 4.5847E−03 |
| A12 = | 5.0729E+00 | 4.6857E−01 | −1.0910E−02 | −4.7624E−03 | 2.9441E−03 | −4.1183E−04 |
| A14 = | −1.1889E+00 | −6.6818E−02 | 1.6603E−03 | 4.8957E−04 | −1.5278E−04 | 1.5267E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th embodiment | | | |
|---|---|---|---|
| f [mm] | 3.19 | |f/f4| + f/f5 | 2.64 |
| Fno | 2.25 | f5/f2 | 0.12 |
| HFOV [deg.] | 46.0 | f/f1 | 0.32 |
| V2 | 55.9 | f/f2 | 0.19 |
| V3 − V4 | 34.5 | FOV [deg.] | 92.0 |
| (T45 + T56)/T34 | 0.41 | SL/TTL | 0.92 |
| R5/R6 | 8.72 | TTL/ImgH | 1.42 |
| R9/R10 | −0.98 | | |

6th Embodiment

Figure 11:
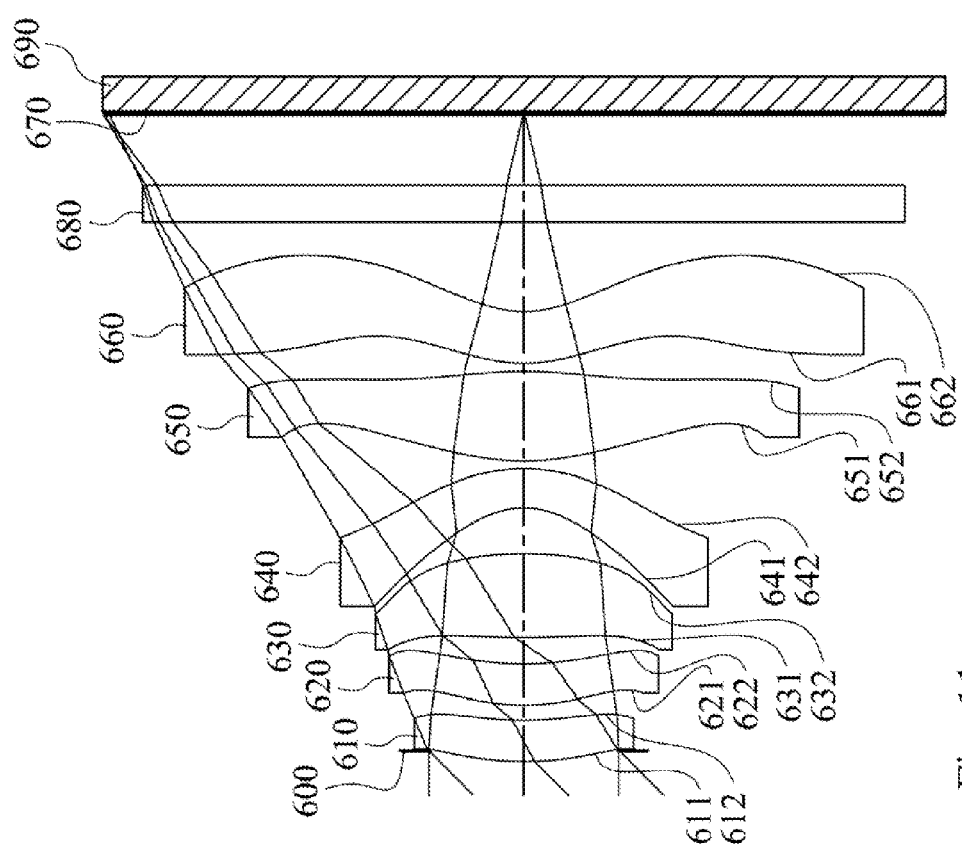
FIG. 11 is a schematic view of an image capturing device according to the 6th embodiment of the present disclosure.
Figure 12:
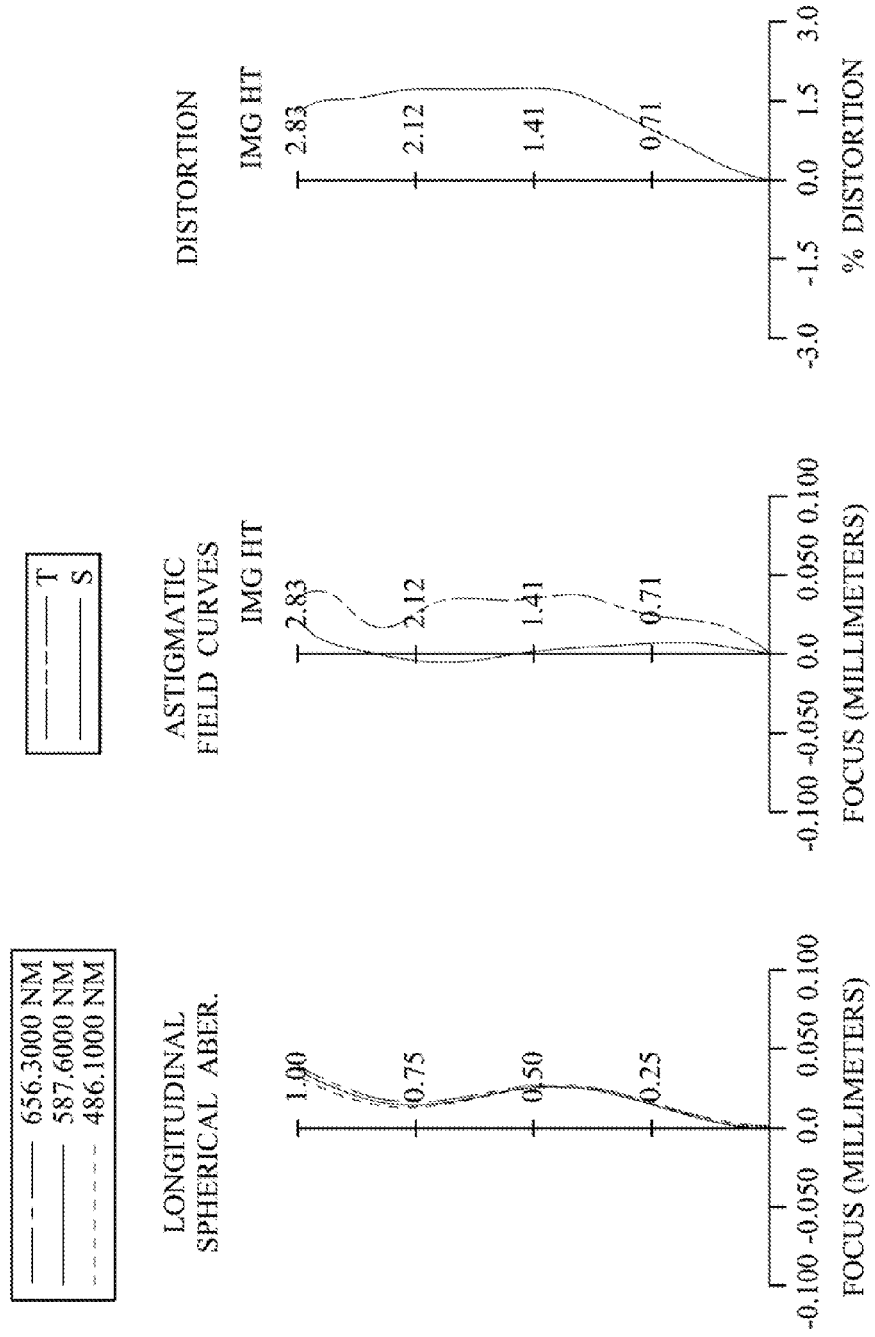
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the optical imaging lens system (not otherwise herein labeled) of the present disclosure and an image sensor 690. The optical imaging lens system includes, in order from an object side to an image side, an aperture stop 600, a first lens element 610, a second lens element 620, a third lens element 630, a fourth lens element 640, a fifth lens element 650, a sixth lens element 660, an IR-cut filter 680 and an image plane 670, wherein the optical imaging lens system has a total of six lens elements (610-660) with refractive power.

The first lens element 610 with positive refractive power has a convex object-side surface 611 and a concave image-side surface 612, which are both aspheric, and the first lens element 610 is made of plastic material.

The second lens element 620 with positive refractive power has a convex object-side surface 621 and a concave image-side surface 622, which are both aspheric, and the second lens element 620 is made of plastic material. Specifically, the second lens element 620 has the object-side surface 621 being convex in a paraxial region thereof, wherein the object-side surface 621 of the second lens element 620 has at least one concave shape in an off-axis region thereof. The second lens element 620 has the image-side surface 622 being concave in a paraxial region thereof, wherein the image-side surface 622 of the second lens element 620 has at least one convex shape in an off-axis region thereof.

The third lens element 630 with positive refractive power has a convex object-side surface 631 and a convex image-side surface 632, which are both aspheric, and the third lens element 630 is made of plastic material.

The fourth lens element 640 with negative refractive power has a concave object-side surface 641 and a convex image-side surface 642, which are both aspheric, and the fourth lens element 640 is made of plastic material.

The fifth lens element 650 with positive refractive power has a convex object-side surface 651 and a convex image-side surface 652, which are both aspheric, and the fifth lens element 650 is made of plastic material.

The sixth lens element 660 with negative refractive power has a convex object-side surface 661 and a concave image-side surface 662, which are both aspheric, and the sixth lens element 660 is made of plastic material. Specifically, the sixth lens element 660 has the object-side surface 661 being convex in a paraxial region thereof, wherein the object-side surface 661 of the sixth lens element 660 has at least one concave shape in an off-axis region thereof. The sixth lens element 660 has the image-side surface 662 being concave in a paraxial region thereof, wherein the image-side surface 662 of the sixth lens element 660 has at least one convex shape in an off-axis region thereof. Moreover, both of the object-side surface 661 and the image-side surface 662 of the sixth lens element 660 have at least one inflection point.

The IR-cut filter 680 is made of glass and located between the sixth lens element 660 and the image plane 670, and will not affect the focal length of the optical imaging lens system. The image sensor 690 is disposed on the image plane 670 of the optical imaging lens system.

The detailed optical data of the 6th embodiment are shown in Table 11 and the aspheric surface data are shown in Table 12 below.

TABLE 11

6th Embodiment
f = 2.79 mm, Fno = 2.19, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.073 | | | | |
| 2 | Lens 1 | 2.026 | ASP | 0.278 | Plastic | 1.544 | 55.9 | 36.57 |
| 3 | | 2.147 | ASP | 0.100 | | | | |
| 4 | Lens 2 | 1.419 | ASP | 0.275 | Plastic | 1.544 | 55.9 | 8.36 |
| 5 | | 1.921 | ASP | 0.182 | | | | |
| 6 | Lens 3 | 5.451 | ASP | 0.560 | Plastic | 1.544 | 55.9 | 3.21 |
| 7 | | −2.482 | ASP | 0.313 | | | | |
| S | Lens 4 | −0.516 | ASP | 0.260 | Plastic | 1.640 | 23.3 | −1.76 |
| 9 | | −1.138 | ASP | 0.050 | | | | |
| 10 | Lens 5 | 1.527 | ASP | 0.608 | Plastic | 1.544 | 55.9 | 1.88 |
| 11 | | −2.683 | ASP | 0.050 | | | | |
| 12 | Lens 6 | 1.056 | ASP | 0.352 | Plastic | 1.544 | 55.9 | −7.89 |
| 13 | | 0.748 | ASP | 0.600 | | | | |
| 14 | IR-cut filter | Plano | | 0.250 | Glass | 1.517 | 64.2 | — |
| 15 | | Plano | | 0.484 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | −1.2885E+00 | −8.2166E−01 | −4.1491E+00 | −4.6094E+00 | −2.1551E+00 | 4.1469E+00 |
| A4 = | −7.7139E−02 | −3.5815E−01 | −1.5910E−01 | −5.5275E−02 | −1.6211E−01 | −3.7936E−02 |
| A6 = | 1.0880E−01 | 4.5328E−01 | 3.6786E−01 | −1.1531E−02 | 5.0082E−02 | −4.3853E−01 |
| A8 = | −4.3560E−01 | −2.1343E+00 | −1.9921E+00 | −8.1457E−02 | −2.4948E−01 | 1.0189E+00 |
| A10 = | −1.0898E−02 | 4.6724E+00 | 4.6092E+00 | −4.8998E−01 | −4.2011E−01 | −1.3052E+00 |
| A12 = | 7.4260E−01 | −7.1562E+00 | −7.2859E+00 | 9.6919E−01 | 1.1424E+00 | 4.9712E−01 |
| A14 = | −1.0028E+00 | 4.7918E+00 | 4.6681E+00 | −6.3861E−01 | −6.0084E−01 | 1.4849E−01 |

| Surface # | 8 | 9 | 10 | 11 | 12 | 13 |
|---|---|---|---|---|---|---|
| k = | −1.2622E+00 | −1.3363E+00 | −1.4102E+01 | −5.7380E+00 | −3.8479E+00 | −2.9169E+00 |
| A4 = | 9.8900E−01 | 2.1063E−01 | 4.5205E−02 | 2.1327E−01 | −1.6121E−01 | −1.5899E−01 |
| A6 = | −4.2342E+00 | −9.2367E−01 | −3.8104E−02 | −1.4776E−01 | −1.6901E−02 | 5.3118E−02 |
| A8 = | 1.0393E+01 | 1.7968E+00 | 1.2458E−02 | 4.7264E−02 | 4.6369E−02 | −7.2418E−03 |
| A10 = | −1.3901E+01 | −1.6058E+00 | −6.8848E−03 | −4.8046E−03 | −1.6120E−02 | −4.4395E−04 |
| A12 = | 9.5379E+00 | 6.9365E−01 | 2.4338E−03 | −8.5504E−04 | 2.3342E−03 | 2.1877E−04 |
| A14 = | −2.6377E+00 | −1.1787E−01 | −3.8501E−04 | 1.6581E−04 | −1.2658E−04 | −1.6100E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th embodiment | | | |
|---|---|---|---|
| f [mm] | 2.79 | \|f/f4\| + f/f5 | 3.06 |
| Fno | 2.19 | f5/f2 | 0.23 |
| HFOV [deg.] | 44.9 | f/f1 | 0.08 |
| V2 | 55.9 | f/f2 | 0.33 |
| V3 − V4 | 32.6 | FOV [deg.] | 89.8 |
| (T45 + T56)/T34 | 0.32 | SL/TTL | 0.98 |
| R5/R6 | −2.20 | TTL/ImgH | 1.51 |
| R9/R10 | −0.57 | | |

7th Embodiment

Figure 13:
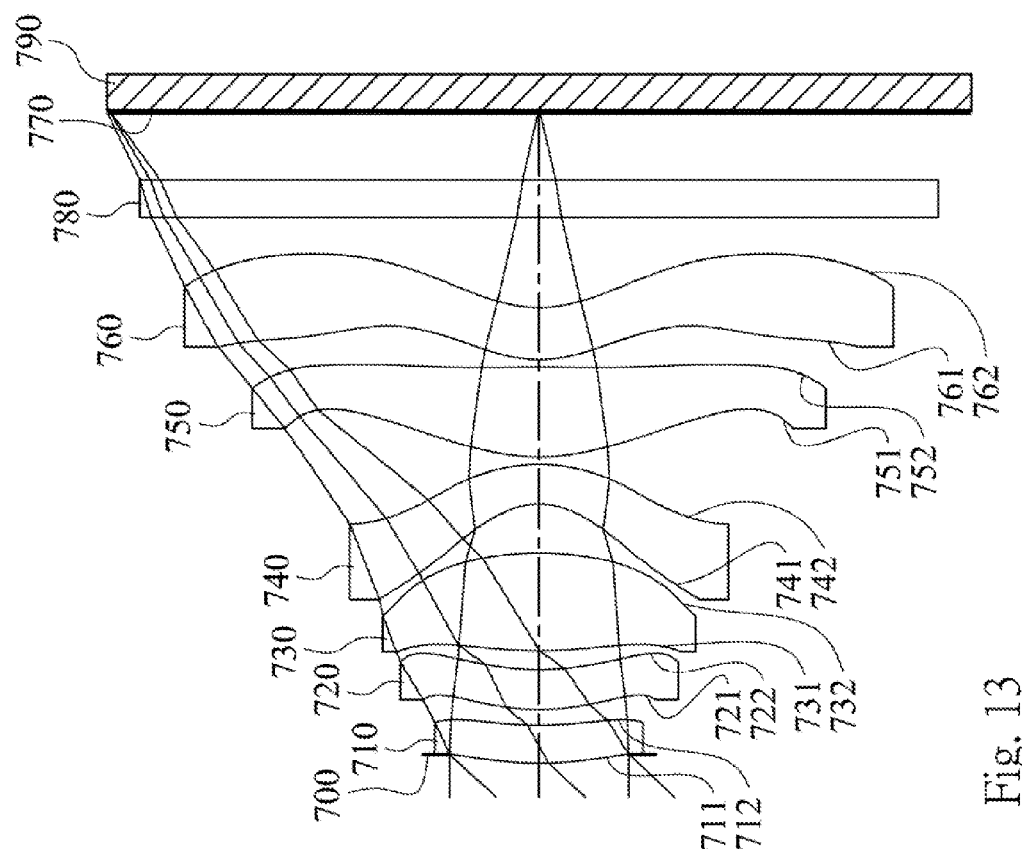
FIG. 13 is a schematic view of an image capturing device according to the 7th embodiment of the present disclosure.
Figure 14:
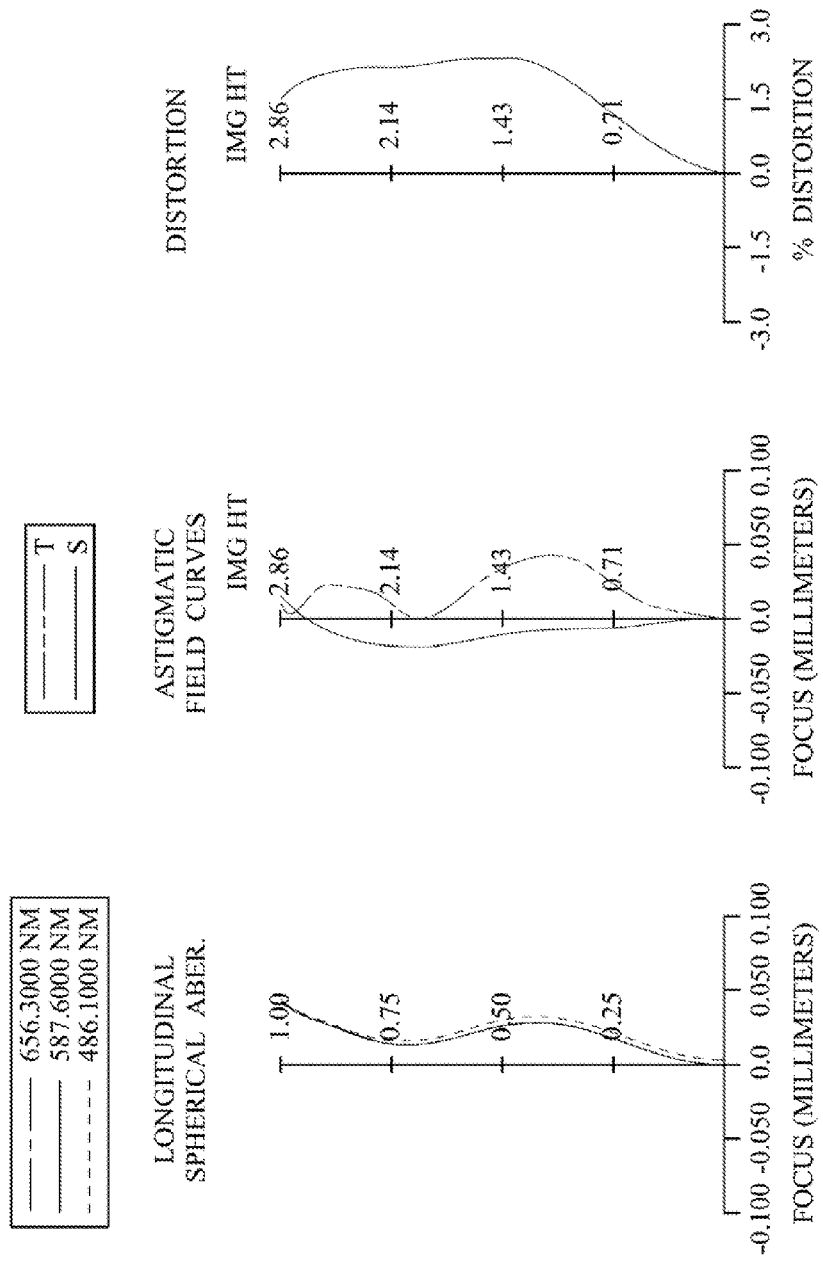
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment.

In FIG. 13, the image capturing device includes the optical imaging lens system (not otherwise herein labeled) of the present disclosure and an image sensor 790. The optical imaging lens system includes, in order from an object side to an image side, an aperture stop 700, a first lens element 710, a second lens element 720, a third lens element 730, a fourth lens element 740, a fifth lens element 750, a sixth lens element 760, an IR-cut filter 780 and an image plane 770, wherein the optical imaging lens system has a total of six lens elements (710-760) with refractive power.

The first lens element 710 with negative refractive power has a convex object-side surface 711 and a concave image-side surface 712, which are both aspheric, and the first lens element 710 is made of plastic material.

The second lens element 720 with positive refractive power has a convex object-side surface 721 and a concave image-side surface 722, which are both aspheric, and the second lens element 720 is made of plastic material. Specifically, the second lens element 720 has the object-side surface 721 being convex in a paraxial region thereof, wherein the object-side surface 721 of the second lens element 720 has at least one concave shape in an off-axis region thereof. The second lens element 720 has the image-side surface 722 being concave in a paraxial region thereof, wherein the image-side surface 722 of the second lens element 720 has at least one convex shape in an off-axis region thereof.

The third lens element 730 with positive refractive power has a convex object-side surface 731 and a convex image-side surface 732, which are both aspheric, and the third lens element 730 is made of plastic material.

The fourth lens element 740 with negative refractive power has a concave object-side surface 741 and a convex image-side surface 742, which are both aspheric, and the fourth lens element 740 is made of plastic material.

The fifth lens element 750 with positive refractive power has a convex object-side surface 751 and a convex image-side surface 752, which are both aspheric, and the fifth lens element 750 is made of plastic material.

The sixth lens element 760 with positive refractive power has a convex object-side surface 761 and a concave image-side surface 762, which are both aspheric, and the sixth lens element 760 is made of plastic material. Specifically, the sixth lens element 760 has the object-side surface 761 being convex in a paraxial region thereof, wherein the object-side surface 761 of the sixth lens element 760 has at least one concave shape in an off-axis region thereof. The sixth lens element 760 has the image-side surface 762 being concave in a paraxial region thereof, wherein the image-side surface 762 of the sixth lens element 760 has at least one convex shape in an off-axis region thereof. Moreover, both of the object-side surface 761 and the image-side surface 762 of the sixth lens element 760 have at least one inflection point.

The IR-cut filter 780 is made of glass and located between the sixth lens element 760 and the image plane 770, and will not affect the focal length of the optical imaging lens system. The image sensor 790 is disposed on the image plane 770 of the optical imaging lens system.

The detailed optical data of the 7th embodiment are shown in Table 13 and the aspheric surface data are shown in Table 14 below.

TABLE 13

7th Embodiment
f = 2.60 mm, Fno = 2.19, HFOV = 47.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.058 | | | | |
| 2 | Lens 1 | 2.421 | ASP | 0.252 | Plastic | 1.544 | 55.9 | −128.14 |
| 3 | | 2.254 | ASP | 0.100 | | | | |
| 4 | Lens 2 | 1.413 | ASP | 0.269 | Plastic | 1.544 | 55.9 | 12.26 |
| 5 | | 1.673 | ASP | 0.127 | | | | |
| 6 | Lens 3 | 2.969 | ASP | 0.650 | Plastic | 1.544 | 55.9 | 2.40 |
| 7 | | −2.150 | ASP | 0.328 | | | | |
| 8 | Lens 4 | −0.461 | ASP | 0.260 | Plastic | 1.640 | 23.3 | −1.50 |
| 9 | | −1.082 | ASP | 0.050 | | | | |
| 10 | Lens 5 | 1.340 | ASP | 0.599 | Plastic | 1.544 | 55.9 | 2.21 |
| 11 | | −9.725 | ASP | 0.050 | | | | |
| 12 | Lens 6 | 0.872 | ASP | 0.350 | Plastic | 1.544 | 55.9 | 11.95 |
| 13 | | 0.865 | ASP | 0.600 | | | | |
| 14 | IR-cut filter | Plano | | 0.250 | Glass | 1.517 | 64.2 | — |

TABLE 13-continued

7th Embodiment
f = 2.60 mm, Fno = 2.19, HFOV = 47.1 deg.

| Surface # | | Curvature Radius | Thickness | Material | Index | Abbe # | Focal Length |
|---|---|---|---|---|---|---|---|
| 15 | | Plano | 0.454 | | | | |
| 16 | Image | Plano | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −3.6271E+00 | −4.4470E+00 | −4.1491E+00 | −4.6094E+00 | −2.1551E+00 | 2.8856E+00 |
| A4 = | −9.2343E−02 | −3.3021E−01 | −2.3390E−01 | −1.0419E−01 | −1.4213E−01 | −2.5864E−02 |
| A6 = | 1.3600E−01 | 4.1974E−01 | 7.1470E−01 | −1.4577E−02 | 1.3414E−01 | 3.2334E−02 |
| A8 = | 1.9630E−01 | −1.1705E+00 | −2.0440E+00 | 8.5196E−01 | −6.8302E−01 | −7.9934E−01 |
| A10 = | −4.9418E+00 | 1.6733E−01 | 1.7301E+00 | −3.0910E+00 | 9.6984E−01 | 2.1894E+00 |
| A12 = | 1.3682E+01 | 6.6949E−01 | −2.8978E−01 | 3.7382E+00 | −7.3360E−01 | −2.4146E+00 |
| A14 = | −1.2942E+01 | −3.4243E−01 | −1.2820E+00 | −1.7168E+00 | 2.6776E−01 | 9.7022E−01 |

| Surface # | 8 | 9 | 10 | 11 | 12 | 13 |
|---|---|---|---|---|---|---|
| k = | −1.3915E+00 | −1.5771E+00 | −3.9883E+00 | −5.7380E+00 | −2.6746E+00 | −1.0665E+00 |
| A4 = | 7.9415E−01 | 1.8720E−01 | −7.3274E−02 | 1.9211E−01 | −2.1681E−01 | −4.1060E−01 |
| A6 = | −3.5253E+00 | −1.0990E+00 | 6.9754E−02 | −2.1644E−01 | −2.7649E−03 | 1.8692E−01 |
| A8 = | 8.6596E+00 | 2.3200E+00 | −6.0081E−02 | 1.1728E−01 | 5.1477E−02 | −5.3792E−02 |
| A10 = | −1.0390E+01 | −2.0549E+00 | 2.9577E−02 | −3.3057E−02 | −1.9010E−02 | 9.6061E−03 |
| A12 = | 6.0711E+00 | 8.4844E−01 | −8.2079E−03 | 4.4423E−03 | 2.7665E−03 | −9.7356E−04 |
| A14 = | −1.3996E+00 | −1.3526E−01 | 8.8609E−04 | −2.1974E−04 | −1.4641E−04 | 4.2255E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th embodiment | | | |
|---|---|---|---|
| f [mm] | 2.60 | |f/f4| + f/f5 | 2.91 |
| Fno | 2.19 | f5/f2 | 0.18 |
| HFOV [deg.] | 47.1 | f/f1 | −0.02 |
| V2 | 55.9 | f/f2 | 0.21 |
| V3 − V4 | 32.6 | FOV [deg.] | 94.2 |
| (T45 + T56)/T34 | 0.30 | SL/TTL | 0.99 |
| R5/R6 | −1.38 | TTL/ImgH | 1.49 |
| R9/R10 | −0.14 | | |

8th Embodiment

Figure 15:
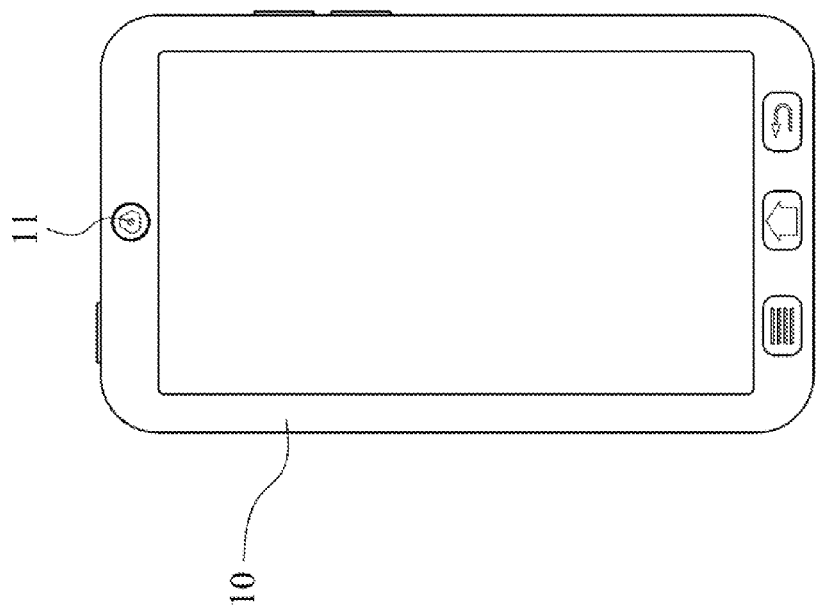
FIG. 15 shows an image capturing device according to the 8th embodiment.

FIG. 15 is a schematic view of a mobile terminal 10 according to the 8th embodiment of the present disclosure. The mobile terminal 10 of the 8th embodiment is a smart phone, wherein the mobile terminal 10 includes an image capturing device 11. The image capturing device 11 includes an optical imaging lens system (not otherwise herein labeled) according to the present disclosure and an image sensor (not otherwise herein labeled), wherein the image sensor is disposed on an image plane of the optical imaging lens system.

9th Embodiment

Figure 16:
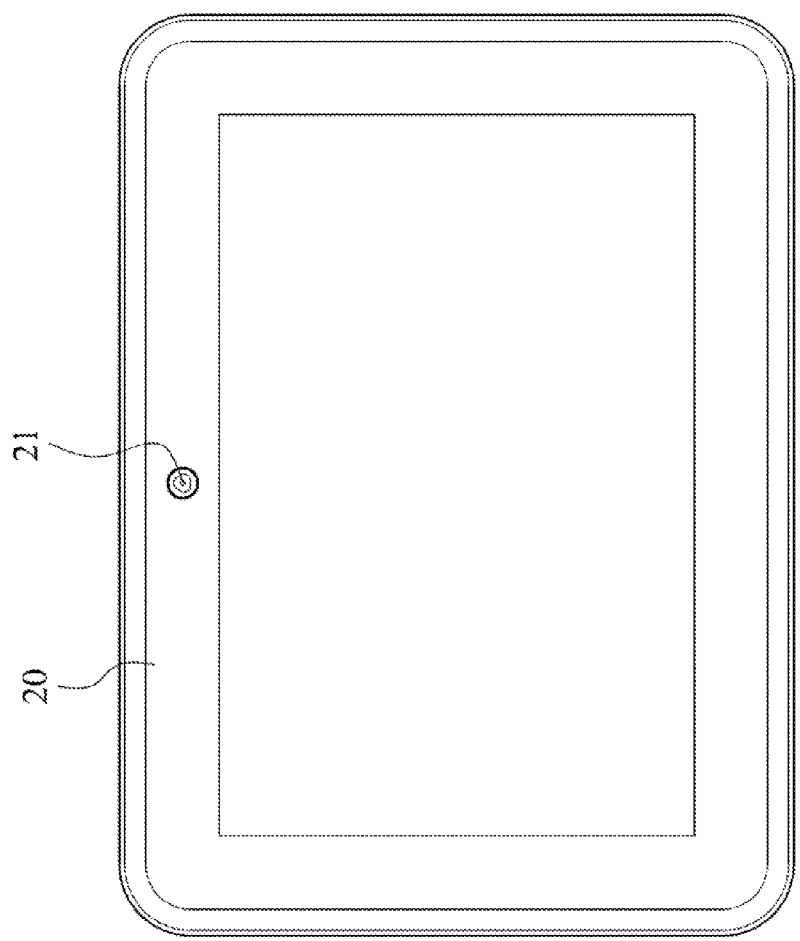
FIG. 16 shows an image capturing device according to the 9th embodiment.

FIG. 16 is a schematic view of a mobile terminal 20 according to the 9th embodiment of the present disclosure. The mobile terminal 20 of the 9th embodiment is a tablet personal computer, wherein the mobile terminal 20 includes an image capturing device 21. The image capturing device 21 includes an optical imaging lens system (not otherwise herein labeled) according to the present disclosure and an image sensor (not otherwise herein labeled), wherein the image sensor is disposed on an image plane of the optical imaging lens system.

10th Embodiment

Figure 17:
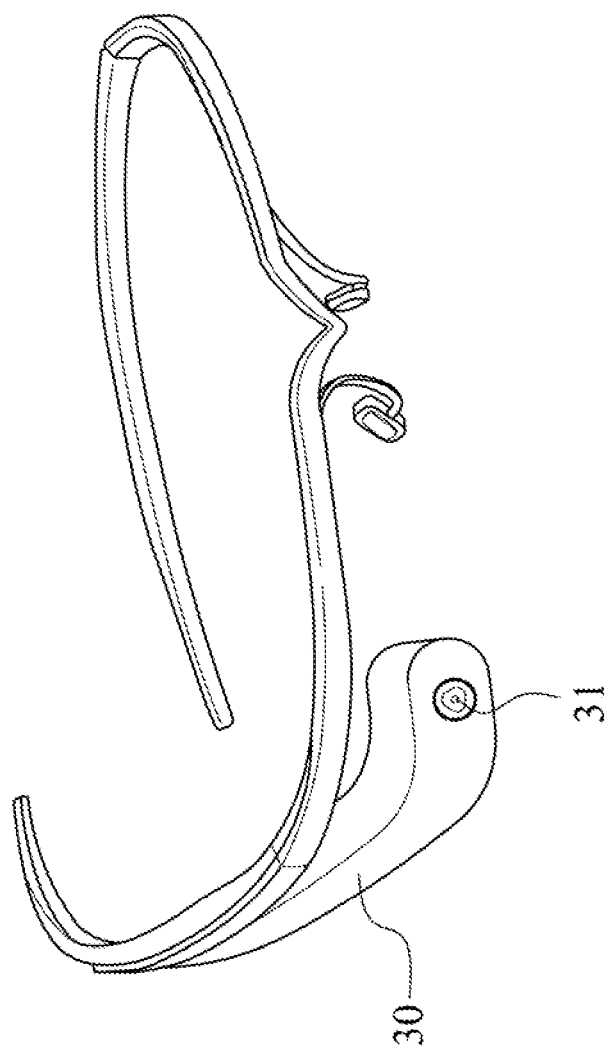
FIG. 17 shows an image capturing device according to the 10th embodiment.

FIG. 17 is a schematic view of a mobile terminal 30 according to the 10th embodiment of the present disclosure. The mobile terminal 30 of the 10th embodiment is a head-mounted display, wherein the mobile terminal 30 includes an image capturing device 31. The image capturing device 31 includes an optical imaging lens system (not otherwise herein labeled) according to the present disclosure and an image sensor (not otherwise herein labeled), wherein the image sensor is disposed on an image plane of the optical imaging lens system.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising, in order from an object side to an image side:
    a first lens element having refractive power;
    a second lens element having positive refractive power;
    a third lens element having positive refractive power;
    a fourth lens element having refractive power;
    a fifth lens element with positive refractive power having a convex object-side surface and a convex image-side surface, wherein the object-side surface and the image-side surface of the fifth lens element are aspheric; and
    a sixth lens element with refractive power having a concave image-side surface, wherein an object-side surface and the image-side surface of the sixth lens element are aspheric, and at least one of the object-side surface and the image-side surface of the sixth lens element has at least one inflection point;
    wherein the optical imaging lens system has a total of six lens elements with refractive power, a curvature radius of the object-side surface of the fifth lens element is R9, a curvature radius of the image-side surface of the fifth lens element is R10, a focal length of the optical imaging lens system is f, a focal length of the fourth lens element is f4, a focal length of the fifth lens element is f5, and the following conditions are satisfied:

$-1.0 < R9/R10 < 0$; and $2.25 < |f/f4| + f/f5 < 5.0$.

2. The optical imaging lens system of claim 1, wherein the first lens element has a convex object-side surface.

3. The optical imaging lens system of claim 2, wherein the fourth lens element has negative refractive power, and the third lens element has a convex image-side surface.

4. The optical imaging lens system of claim 3, wherein the fourth lens element has a concave object-side surface and a convex image-side surface, and the sixth lens element has the object-side surface being convex.

5. The optical imaging lens system of claim 4, wherein the second lens element has a convex object-side surface and a concave image-side surface.

6. The optical imaging lens system of claim 2, wherein a curvature radius of an object-side surface of the third lens element is R5, a curvature radius of an image-side surface of the third lens element is R6, and the following condition is satisfied:

$-4 < R5/R6 < 20$.

7. The optical imaging lens system of claim 6, wherein an axial distance between the third lens element and the fourth lens element is T34, an axial distance between the fourth lens element and the fifth lens element is T45, an axial distance between the fifth lens element and the sixth lens element is T56, and the following condition is satisfied:

$0 < (T45 + T56)/T34 < 0.6$.

8. The optical imaging lens system of claim 6, wherein a focal length of the second lens element is f2, the focal length of the fifth lens element is f5, and the following condition is satisfied:

$0 < f5/f2 < 0.8$.

9. The optical imaging lens system of claim 2, wherein the sixth lens element has the object-side surface being convex in a paraxial region thereof, the object-side surface of the sixth lens element has at least one concave shape in an off-axis region thereof, the sixth lens element has the image-side surface being concave in a paraxial region thereof, and the image-side surface of the sixth lens element has at least one convex shape in an off-axis region thereof.

10. The optical imaging lens system of claim 2, wherein an Abbe number of the third lens element is V3, an Abbe number of the fourth lens element is V4, and the following condition is satisfied:

$20 < V3 - V4 < 50$.

11. The optical imaging lens system of claim 2, wherein the focal length of the optical imaging lens system is f, a focal length of the first lens element is f1, and the following condition is satisfied:

$-0.60 < f/f1 < 0.40$.

12. The optical imaging lens system of claim 1, wherein an axial distance between an object-side surface of the first lens element and an image plane is TTL, a maximum image height of the optical imaging lens system is ImgH, and the following condition is satisfied:

$TTL/ImgH < 1.8$.

13. An image capturing device, comprising:
    the optical imaging lens system of claim 1; and
    an image sensor, wherein the image sensor is located on an image plane of the optical imaging lens system.

14. A mobile terminal, comprising:
    the image capturing device of claim 13.

15. An optical imaging lens system comprising, in order from an object side to an image side:
    a first lens element having refractive power;
    a second lens element having positive refractive power;
    a third lens element having positive refractive power;
    a fourth lens element having refractive power;
    a fifth lens element with positive refractive power having a convex object-side surface and a convex image-side surface, wherein the object-side surface and the image-side surface of the fifth lens element are aspheric; and
    a sixth lens element with refractive power having a concave image-side surface, wherein an object-side surface and the image-side surface of the sixth lens element are aspheric, and at least one of the object-side surface and the image-side surface of the sixth lens element has at least one inflection point;
    wherein the optical imaging lens system has a total of six lens elements with refractive power, a curvature radius of the object-side surface of the fifth lens element is R9, a curvature radius of the image-side surface of the fifth lens element is R10, a focal length of the optical imaging lens system is f, a focal length of the second lens element is f2, and the following conditions are satisfied:

$-1.0 < R9/R10 < 0$; and $0.05 < f/f2 < 0.70$.

16. The optical imaging lens system of claim 15, wherein the second lens element has a convex object-side surface, and the third lens element has a convex image-side surface.

17. The optical imaging lens system of claim 15, wherein a maximal field of view of the optical imaging lens system is FOV, and the following condition is satisfied:

$70 \text{ degrees} < FOV < 120 \text{ degrees}$.

18. The optical imaging lens system of claim 15, wherein a curvature radius of an object-side surface of the third lens element is R5, a curvature radius of an image-side surface of the third lens element is R6, and the following condition is satisfied:

$-4 < R5/R6 < 0$.

19. The optical imaging lens system of claim 15, wherein an Abbe number of the second lens element is V2, and the following condition is satisfied:

$30 < V2$.

20. The optical imaging lens system of claim 15, wherein the focal length of the second lens element is f2, a focal length of the third lens element is f3, a focal length of the fourth lens element is f4, and the following condition is satisfied:

$|f4| < f3 < 2$.

21. The optical imaging lens system of claim 15, wherein the focal length of the optical imaging lens system is f, a focal length of the first lens element is f1, and the following condition is satisfied:

$-0.50 < f/f1 < 0.25$.

22. An optical imaging lens system comprising, in order from an object side to an image side:
  a first lens element having refractive power;
  a second lens element having positive refractive power;
  a third lens element having positive refractive power;
  a fourth lens element having negative refractive power;
  a fifth lens element with positive refractive power having a convex object-side surface and a convex image-side surface, wherein the object-side surface and the image-side surface of the fifth lens element are aspheric; and
  a sixth lens element with refractive power having a concave image-side surface, wherein an object-side surface and the image-side surface of the sixth lens element are aspheric, and at least one of the object-side surface and the image-side surface of the sixth lens element has at least one inflection point;
  wherein the optical imaging lens system has a total of six lens elements with refractive power, a curvature radius of an object-side surface of the third lens element is R5, a curvature radius of an image-side surface of the third lens element is R6, a curvature radius of the object-side surface of the fifth lens element is R9, a curvature radius of the image-side surface of the fifth lens element is R10, a focal length of the optical imaging lens system is f, a focal length of the second lens element is f2, and the following conditions are satisfied:

$-1.0 < R9/R10 < 0$;

$0 < f/f2 < 0.70$; and $-4 < R5/R6 < 20$.

23. The optical imaging lens system of claim 22, wherein the first lens element has a convex object-side surface, the fourth lens element has a concave object-side surface and a convex image-side surface, and the sixth lens element has the object-side surface being convex.

24. The optical imaging lens system of claim 22, wherein the second lens element has an object-side surface being convex in a paraxial region thereof, the object-side surface of the second lens element has at least one concave shape in an off-axis region thereof, the second lens element has an image-side surface being concave in a paraxial region thereof, and the image-side surface of the second lens element has at least one convex shape in an off-axis region thereof.

25. The optical imaging lens system of claim 22, comprising:
  a stop,
  wherein an axial distance between the stop and an image plane is SL, an axial distance between an object-side surface of the first lens element and the image plane is TTL, and the following condition is satisfied:

$0.88 < SL/TTL < 1.2$.

26. The optical imaging lens system of claim 22, wherein a maximal field of view of the optical imaging lens system is FOV, an f-number of the optical imaging lens system is Fno, and the following conditions are satisfied:

70 degrees $< FOV < 120$ degrees; and $1.5 < Fno < 2.3$.

* * * * *

UNITED STATES PATENT AND TRADEMARK OFFICE
CERTIFICATE OF CORRECTION

| | | |
|---|---|---|
| PATENT NO. | : 8,908,290 B1 | Page 1 of 1 |
| APPLICATION NO. | : 14/049234 | |
| DATED | : December 9, 2014 | |
| INVENTOR(S) | : Lin-Yao Liao and Hsin-Hsuan Huang | |

It is certified that error appears in the above-identified patent and that said Letters Patent is hereby corrected as shown below:

In the Claims,

In column 31, line 17, Claim 20 of the issued patent reads as "$|f4| < f3 < 2$", but it should read as "$|f4| < f3 < f2$".

Signed and Sealed this
Twenty-fourth Day of March, 2015

Michelle K. Lee
*Director of the United States Patent and Trademark Office*